(12) United States Patent
Geaghan et al.

(10) Patent No.: US 7,254,775 B2
(45) Date of Patent: Aug. 7, 2007

(54) TOUCH PANEL SYSTEM AND METHOD FOR DISTINGUISHING MULTIPLE TOUCH INPUTS

(75) Inventors: Bernard O. Geaghan, Salem, MA (US); Robert S. Moshrefzadeh, Oakdale, MN (US); Craig A. Cordeiro, Westford, MA (US); Edward S. Hagermoser, Lancaster, MA (US); James J. Hart, Georgetown, MA (US); Paul M. Hatin, Londonderry, NH (US); Karl P. Hauck, Somerville, MA (US); Richard A. Peterson, Jr., Chelmsford, MA (US); Stephen C. Schulz, Lee, NH (US); Gordon F. Taylor, Bolton, MA (US)

(73) Assignee: 3M Innovative Properties Company, Saint Paul, MN (US)

( * ) Notice: Subject to any disclaimer, the term of this patent is extended or adjusted under 35 U.S.C. 154(b) by 1038 days.

(21) Appl. No.: 09/970,474

(22) Filed: Oct. 3, 2001

(65) Prior Publication Data
US 2003/0063073 A1 Apr. 3, 2003

(51) Int. Cl.
*G06F 9/00* (2006.01)
(52) U.S. Cl. ............... 715/701; 345/173; 345/179; 178/18.01; 715/702; 715/863; 715/856; 715/857; 715/858; 715/859; 715/860; 715/861; 715/862
(58) Field of Classification Search ............ 715/701, 715/702, 863, 856, 857, 858, 859, 860, 861, 715/862; 345/173, 179; 178/18.01
See application file for complete search history.

(56) References Cited

U.S. PATENT DOCUMENTS 4,686,332 A 8/1987 Greanias et al.

(Continued)

FOREIGN PATENT DOCUMENTS

EP 0309946 4/1989

(Continued)

OTHER PUBLICATIONS

IntelliTouch/SecureTouch/iTouch Surface Wave Touchscreens, *A Technical Comparison with Other Technologies*, ELO TouchSystems, Inc., 1999-2001 [from internet on Oct. 1, 2001], URL <www.elotouch.com/products/inteltec/inteltecm.asp>.

(Continued)

*Primary Examiner*—Kristine Kincaid
*Assistant Examiner*—Peng Ke

(57) ABSTRACT

Touch panel systems and methods are disclosed that can distinguish temporally overlapping touch inputs from single touch inputs so that valid touch position coordinates can be determined. Touch panel systems and methods of the present invention can distinguish overlapping touches by comparing signal magnitudes to specified thresholds, by comparing the rates of change of signal magnitudes or measured positions to determined parameters, by locating the proximity a calculated location to icons or other such active areas, and the like. Because touch panel systems and methods of the present invention can discriminate single touches from double touches, they can be used in multiple user applications such as multiplayer games as well as in applications that may be subject to rapidly successive or overlapping touch inputs.

13 Claims, 14 Drawing Sheets

U.S. PATENT DOCUMENTS

| | | | |
|---|---|---|---|
| 4,707,845 A | 11/1987 | Krein et al. | |
| 5,153,572 A | 10/1992 | Caldwell et al. | |
| 5,402,151 A | 3/1995 | Duwaer | |
| 5,484,967 A | 1/1996 | Yanagisawa et al. | |
| 5,539,427 A * | 7/1996 | Bricklin et al. | 345/622 |
| 5,589,856 A | 12/1996 | Stein et al. | |
| 5,943,043 A | 8/1999 | Furuhata et al. | |
| 6,008,800 A | 12/1999 | Pryor | |
| 6,163,313 A | 12/2000 | Aroyan et al. | |
| 6,225,985 B1 | 5/2001 | Armstrong et al. | |
| 6,236,391 B1 | 5/2001 | Kent et al. | |
| 6,246,395 B1 | 6/2001 | Goyins et al. | |
| 6,255,604 B1 | 7/2001 | Tokioka et al. | |
| 6,590,567 B1 * | 7/2003 | Nagao et al. | 345/173 |
| 6,639,577 B2 * | 10/2003 | Eberhard | 345/102 |
| 6,723,929 B2 * | 4/2004 | Kent | 178/18.04 |
| 6,738,049 B2 * | 5/2004 | Kiser et al. | 345/173 |
| 6,819,313 B2 * | 11/2004 | Abdelhadi et al. | 345/157 |
| 2004/0001048 A1 | 1/2004 | Kraus et al. | |

FOREIGN PATENT DOCUMENTS

| | | |
|---|---|---|
| EP | 0631256 | 12/1994 |
| JP | 01-269120 | 10/1989 |
| JP | 08-083144 | 3/1996 |
| JP | 08-190453 | 7/1996 |
| JP | 08-241161 | 9/1996 |
| JP | 09-292952 | 11/1997 |
| JP | 09-325851 | 12/1997 |
| JP | 2000-010733 | 1/2000 |
| WO | WO 9730416 | 8/1997 |
| WO | WO 9919855 | 4/1999 |

OTHER PUBLICATIONS

ITouch Surface Wave Technology, *"Touch-on-Tube" Technology-A Breakthrough for Gaming and Amusement Machines*, ELO TouchSystems, Inc., Sep. 2001.

U.S. Appl. No. 09/835,040, filed Apr. 13, 2001, "Method and Apparatus for Force-Based Touch Input", pp. 2-88 plus 13 sheets of drawings.

* cited by examiner

TOUCH PANEL SYSTEM AND METHOD FOR DISTINGUISHING MULTIPLE TOUCH INPUTS

This invention generally relates to touch systems and touch digitizers. The invention more particularly relates to touch systems where there can be simultaneous or temporally overlapping touches and to methods for distinguishing multiple touch inputs.

BACKGROUND

Touch panels are often used in electronic display systems as a replacement or supplement to a conventional keyboard and/or a mouse. Touch panels are generally intuitive to use and may require comparatively little training to operate. For example, a user can implement a complex sequence of instructions by simply pressing a touch screen at a location identified by an appropriate icon. The functionality of the icon can be changed by manipulating the supporting software according to the application.

An integral part of a touch system is the mechanism for detecting the location of a touch applied by a user. The detection of touch locations may be based on different technologies. Exemplary technologies include resistive, capacitive, force, infrared (IR), and surface acoustic waves (SAW).

Touch panels are often characterized by several attributes including size, ease of use, resolution, optical performance, and cost. Demand for touch panel devices for user input has increased as the variety of electronic devices has increased, as the desire for portable devices has increased, as desk top and other space has become more limited, and as the functionality of touch screens has improved and expanded.

SUMMARY OF THE INVENTION

Some of the functionalities common for conventional keyboards are not as commonly found in touch systems. For example, special keyboard functions can be accessed by pressing two or more keys at the same time. In a touch system, touches are often meant to be applied sequentially with no overlap, and position detection algorithms have functioned accordingly. There may be applications where it is desired to use a touch panel to detect and discriminate between temporally overlapping touch inputs. By doing so, the touch system may be designed to avoid reporting erroneous, or "phantom", touch positions, and to correctly report any one or more of the singe touch events that make up the overlapping touch inputs.

The present invention provides a touch system and method for identifying temporally overlapping touch events, for example due to two users applying touch input during the same time interval. By identifying such double touch events, valid touch point positions can be reported to the system with more confidence. Double touch events can be discriminated according to the present invention by performing any one or more of the following in any suitable combination and in any suitable order: comparing signal magnitudes to determined threshold values, comparing rates of change of signal magnitudes and/or rates of change of positional data to determined parameters, comparing the proximity of calculated positional data to discretely identified "active" areas such as icons, and determining whether an apparent touch is detected in a region where double touch events have a higher probability of occurring.

Methods of the present invention may be suited for use with various different touch sensor technologies, for example capacitive, resistive, force sensing, surface acoustic wave, infrared, and the like. Because each touch screen technology differs at least somewhat in the touch input signals that are measured, and in the manner that the signals are interpreted, the implementation of aspects of the present invention can have application specific elements. However, many aspects and concepts of the present invention can be analogously applied in touch screen systems independent of the employed sensor technology.

In one aspect, methods of the present invention include measuring signals caused by two or more overlapping touch inputs, measuring positional data for the touch inputs, determining whether any of the signals exceeds a minimum threshold for a single touch input, determining whether any of the signals exceeds a maximum threshold for a single touch input, and calculating and reporting to the touch screen system a touch location using positional data that corresponds to any of the signals that exceeds the minimum threshold but that does not exceed the maximum threshold. The method can further include subtracting the valid positional data from positional data corresponding to any of the signals that exceeds the maximum threshold to calculate a touch location that was otherwise unreported due to the overlapping touches.

In another aspect, the present invention provides a touch screen system that includes a touch panel for measuring touch-based user input signals, an information display disposed for viewing through the touch panel, and a processing unit for discriminating the touch-based user input signals to determine which signals correspond to temporally overlapping individual touch inputs. The processing unit can compare signal magnitudes to one or more predetermined threshold values and can perform one or more of (i) monitoring a signal magnitude rate of change, (ii) monitoring a rate of change of calculated touch position, (iii) monitoring proximity of touch position to one or more designated active areas, or (iv) monitoring proximity of touch position to one or more designated regions of higher double touch probability. The touch panel can be, for example, a capacitive touch panel, a resistive touch panel, a force-based touch panel, a surface acoustic wave touch panel, or the like.

In yet another aspect, the present invention provides a method for distinguishing temporally overlapping touch inputs in a touch screen system by repeatedly measuring a signal caused by one or more touch inputs, monitoring rates of change of the signal, correlating the rates of change of the signal with touch-down, hold, and lift-off events, to determine a sequence of said events, using the determined sequence of said events to determine a temporal ordering of the one or more touches, calculating a touch location of at least one of the one or more touches given the determined sequence, and reporting the touch location. Other steps can be added such as determining that the touch location resides in an area of the touch screen designated as an active area, for example an icon. Also, it might be desired not to report the touch location if the touch location has moved more than a predetermined distance from a preceding calculated touch location.

In another aspect, methods of the present invention can include measuring a predetermined number of touch signals, each measurement being taken at a predetermined time interval, each time interval being shorter than an expected touch input hold duration, calculating a signal total for each of the signals, calculating a touch location for each of the signals that exceed a minimum threshold but remain below a maximum threshold, and reporting a touch position to the touch screen system for any of the calculated touch locations that is less than a predetermined distance away from any of the other calculated touch locations.

The present invention also provides a method for distinguishing valid touch inputs in a touch screen system whereby a predetermined number of touch signals are measured, each measurement taken at a predetermined time interval, each time interval being shorter than an expected touch input hold duration, a signal total for each of the signals is determined, a touch location is calculated for each of the signal totals that exceed a minimum threshold but remain below a maximum threshold, the maximum threshold can be adjusted and the calculating step repeated for any touch location that is within a designated region corresponding to a higher probability of double touch events, and a touch position can be reported to the touch screen system for the calculated touch locations.

In another aspect, the present invention provides a method that includes determining a total signal from a set of measured touch signals, calculating a touch position from the set of measured touch signals when the total signal exceeds a minimum threshold value, performing one or both of: (a) setting a test parameter for rate of change of total signal magnitude based on where the calculated touch position is located, and comparing the total signal magnitude to other recently measured total signal magnitudes to determine whether the test parameter for rate of change of total signal magnitude is satisfied, and (b) setting a test parameter for rate of change of position based on where the calculated touch position is located, and comparing the touch position to other recently measured positions to determine whether the test parameter for rate of change of position is satisfied, and when the applicable test parameter or test parameters is satisfied, reporting the touch position when the total signal does not exceed a maximum threshold.

The present invention further provides a method for distinguishing valid touch inputs in a touch screen system, which method includes measuring a predetermined number of touch signals, each measurement taken at predetermined time intervals, the time intervals being shorter than an expected touch input hold duration, associating a signal parameter with each of the signals, calculating a touch location for each of the signals whose associated parameter is above a minimum threshold but below a maximum threshold, and reporting a touch position to the touch screen system for any of the touch locations calculated in the calculating step.

In yet another aspect, the present invention provides a method for distinguishing phantom touch positions from valid touch positions during a double touch event in a touch screen system by independently measuring an X-coordinate position for each touch in the double touch, independently measuring a Y-coordinate position for each touch in the double touch, determining a rate of change of magnitude of a measured signal corresponding to each X-coordinate position and each Y-coordinate position, matching X-coordinate positions with Y-coordinate positions based on similar rates of change, and reporting the matched X, Y coordinates as the valid touch positions.

BRIEF DESCRIPTION OF THE DRAWINGS

The invention may be more completely understood and appreciated in consideration of the following detailed description of various embodiments of the invention in connection with the accompanying drawings, in which.

Figure 1:
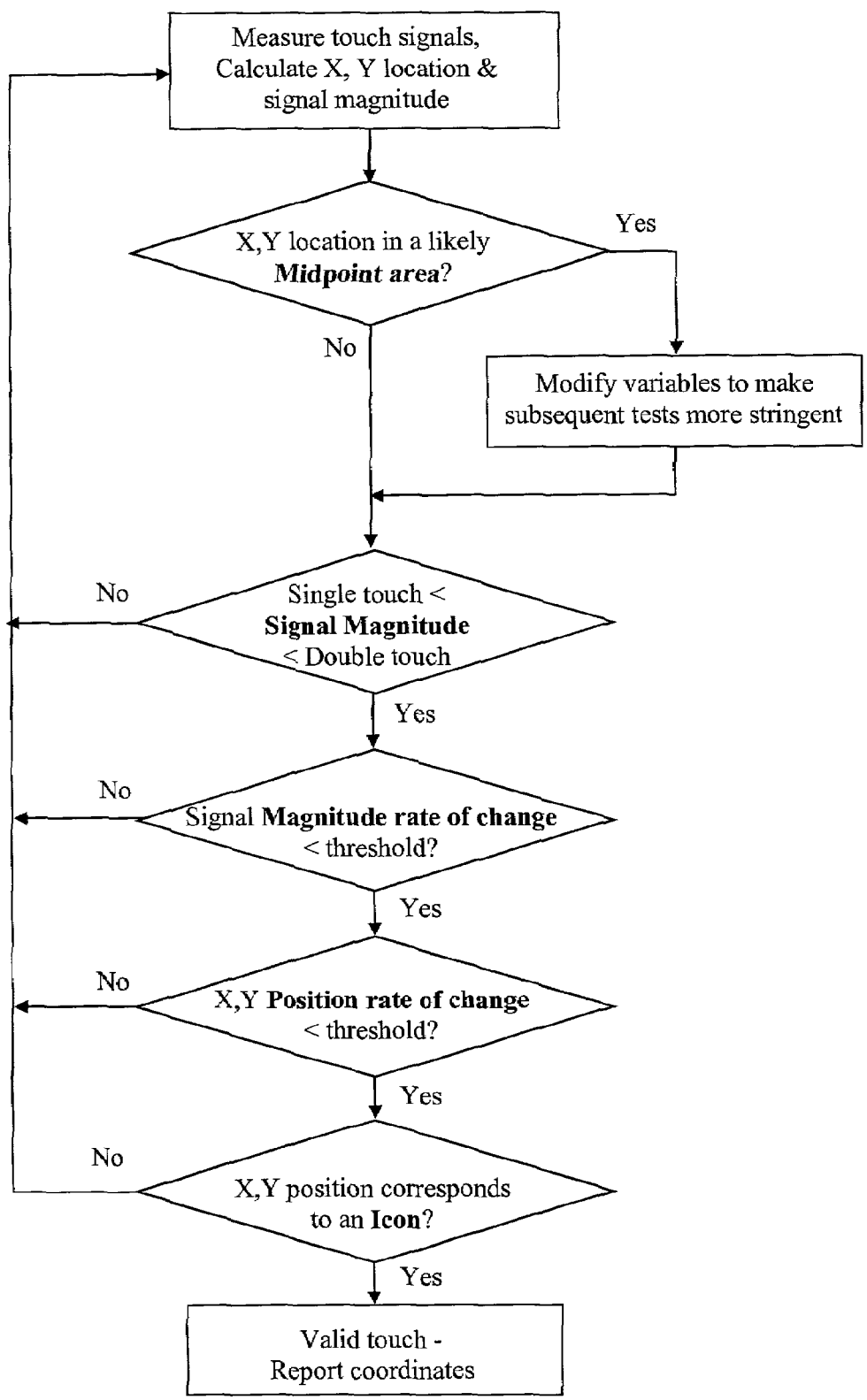
FIG. 1 is a flow chart representing decision steps that can be used in methods of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is generally applicable to touch systems and particularly to touch systems where two or more touches may be applied by one or more users. The present invention is particularly suited to a touch system where some portion of two or more touch inputs may occur simultaneously or otherwise temporally overlap. For example, the present invention may be suited for use in an electronic game system designed to be played by one or more players where, in the course of playing the game, players can apply touch input to generate a response in the game, and where two or more touches may start at the same time and/or end at the same time and/or overlap for at least part of the time during which each touch is applied. Such touch inputs can be referred to as overlapping touches, double touches, or simultaneous touches.

In a touch screen system, the location of a touch applied by a user is generally determined by measuring separate signals generated by the touch input, and comparing the signals, or ratios of the signals, to calculate the position of the touch. The position data can then be correlated to a particular action or instruction, for example. Measured signals include electrical current, electrical voltage, electromagnetic energy, acceleration, force per unit area, and the like. Assuming a properly calibrated touch system, the calculated position of a touch should be sufficiently close to the actual location touched by the user so that the user's intended instruction can be carried out. How close the reported touch location should be to the actual touch location to be sufficiently close is determined, in part, by the resolution of the touch system. A reported touch location that sufficiently closely corresponds to an actual location touched by a user is referred to as a valid touch. As used in this document, reporting a touch location refers to the calculated touch location being used by the touch system in an appropriate manner, for example by the application software to determine the user input instructions. Reporting might include communications from a touch screen controller to a central processing unit, or in a more integrated system can simply entail touch position data being calculated and appropriately used as contemplated by the application.

Generally, a touch applied to a touch screen can be thought of as a time sequence that includes three steps, namely touch-down, hold, and lift-off. The signals that are measured to calculate the location of a touch are determined against a background level, which is the residual signal level present when no touch is being applied. When a touch is applied the signal increases from its background value to a new value, referred to as the hold value, which is measurably different from the background level. The transition from background to a hold level is called touch-down. The applied touch is generally held for a finite time, referred to as the hold time, corresponding to the hold step, during which the hold signal ideally remains relatively constant, or more practically, fluctuates within a range, all values in the range being substantially larger than the background level. The hold time is generally long enough so that a touch location may be measured. It is subsequently calculated and reported. At the end of the hold time, and as the user removes the applied touch, the value of the generated signal decreases from its hold value to a background level. This is referred to as lift-off.

A touch applied to a touch screen at a first location results in the generation of a first set of signals, or positional data, which can be used to determine the location of a first touch, which is generally very close to the actual location of the first touch. When the user lifts off from the first touch location and applies a touch at a second location, a second set of signals are generated that can be used to determine the location of a second touch, which is generally very close to the actual location of the second touch. If during a given time interval the first and second touch locations are both pressed (i.e., the first and second touches temporally overlap), then the first and second sets of signals are superimposed for that time interval, resulting in a third set of signals. How the sets of signals are combined in the superposition depends on a number of factors including the touch panel detection technology used (e.g., resistive, capacitive, force, SAW, IR), the touch panel construction, and the detection algorithm used in the touch system to calculate and report applied touch locations. Generally, the third set of signals, if used to calculate a touch location, may result in reporting a touch location that was not actually touched, and often located at a point between the first and second touch locations. The touch location resulting from the overlapping touch inputs and that does not correspond to any valid or intended touch location can be referred to as a phantom touch. Reporting a phantom touch can result in erroneous user input instructions being given. There is a risk of reporting phantom touches where there are simultaneous touch-downs, simultaneous lift-offs, or otherwise overlapping hold intervals of separate touches.

Using a touch system that reports phantom touches may limit or prohibit the use of the touch screen system in certain applications, such as those applications where two or more simultaneous or overlapping touches may foreseeably, or even desirably, be applied by one or more users. For example, it may be desirable to employ touch screens in electronic games played by two or more players where the players may be using a single touch screen to input information at the same times. Even though each player might use a separate and pre-determined section of the touch screen when playing the game, in the course of playing, many overlapping touch events may occur as each player touches his section of the touch screen. Reporting of phantom touches may result in game responses not intended by one or more of the players. While multiple player games could employ a separate and dedicated touch screen for each player, along with dedicated hardware and/or software, such a solution may not be desirable due to cost considerations, space limitations, functionality, aesthetics, and other factors. Multiple touch screens might also be undesirable for multiple player games or other applications where a single player mode is also contemplated. Other examples where it may be desirable to be able to distinguish temporally overlapping touch inputs include applications such as data entry where a touch screen may be used for entry of information at a fast rate and from more than one location on the screen, whether by one user or multiple users. In the above and many other examples and applications, reporting a phantom touch and a subsequent erroneous response based on such detection may be undesirable and can limit the utility of a touch screen in such applications.

The present invention provides systems and methods for identifying phantom touches due to overlapping touch inputs and for discriminating valid touches from phantom touches, or in other words for discriminating single touches from double (or other multiple) touches. Further, the present invention provides for storing the signals measured during multiple touch overlap so that, upon recording one of the valid touches involved in the multiple touch events, the system can use or discard the overlapping signals as desired. In some embodiments, a valid touch position that would not otherwise be determinable can be determined from overlapping touch signals if one of the other valid touch positions can first be determined.

Although it is contemplated here that the systems and methods of the present invention can be applied to situations where there are one or more users and any number of overlapping touches, it is convenient to describe the present invention in the context of two discrete touch input events that may or may not overlap and that are provided by a user A and a user B.

Various ways are described in this document to identify single touch inputs within a double touch event. One such method involves comparing signal magnitudes to predetermined thresholds to distinguish a single touch from overlapping touches. The signals compared to the thresholds to distinguish single from double touches may be derived from the same signal data used to calculate touch locations, or may be different signal data. During a calibration stage, or during the normal course of obtaining touch input, a range may be established for likely signal values during hold for a single touch. This range may or may not be user specific. This information can be used to set a minimum value to register a single touch and a maximum single touch value above which signals are interpreted as double (or other multiple) touch events. In addition to setting threshold values from a calibration step, thresholds can be preset before use and remain as set, or can be adjusted over time (e.g., periodically during normal use, when a designated region is touched by a user, and the like). Threshold values can be universal or can be specific to each user, as desired. According to the present invention, a phantom touch location calculated from overlapping touches that result in signals larger than the threshold range for a single touch is not reported, but rather the information resulting from generation of such large signals may be stored and used to detect a location of the second touch, or may be used for other purposes.

Another method for distinguishing overlapping touch inputs involves determining and monitoring the rate of change of touch signal magnitudes. A signal's rate of change may be used to identify the touch-down, hold, and lift-off portions of a touch event, as well as any intervening touch-downs, lift-offs, or the like due to overlapping touches. In general, positive rates of change signify a touch-down, negative rates of change signify a lift-off, and near zero or comparatively very small magnitude rates of change signify a hold. Minimum and maximum thresholds can be used to determine whether a rate of change signifies a hold, a touch-down or lift-off, or simultaneous touch-downs or lift-offs of multiple touches. For example, while applying a first touch, a substantially positive rate of change of signal is detected during touch-down. If, while the first touch is in a hold stage, a second touch is applied at a different location on the touch screen, a second substantially positive rate of change of signal may be detected, signifying a new touch. Thus, a first substantially positive rate of change of a signal followed by a second substantially positive rate of change of the signal without an intervening substantial negative rate of change of the signal indicates the application of a second touch while a first touch is in hold. According to the present invention, a phantom touch location calculated and resulting from the signals generated after a second touch is applied while a first touch is in hold is not reported, but rather the signals may be stored and used to locate the position of the second touch, or may be used for other purposes.

Another method to identify a phantom touch according to the present invention involves monitoring the change in the location of a detected touch as a function of time. When a touch is applied and held at a relatively fixed position long enough for a location to be detected, the location is reported, with the reported location being generally very close to the actual location touched by the user. Depending on the duration of the hold, several touch locations may be calculated, all of which are generally very close to the actual touched location. If, while a first touch is in hold, a second touch is applied to a different location on the touch screen and held long enough, the detected location would correspond to a phantom touch positioned somewhere between the first and second touched locations, and in many applications this position is likely to be a substantial distance from either touched location. Thus, in the absence of detecting a lift-off, a rate of change of location of a detected touch that is larger than a pre-determined threshold value indicates the likelihood of a second touch temporally overlapping the first. The pre-determined threshold value is, in part, determined by the resolution of the touch screen. According to the present invention, a phantom touch under these circumstance is not reported, but rather the generated signals used to determine the location of the phantom touch may be stored and used to determine a position of a second touch, or may be used for other purposes.

In another aspect of the invention, where the allowed areas of touch are limited to a finite number of distinct regions, and where a detected touch is sufficiently close to one such region, then a touch is reported. An exemplary aspect of this invention is a touch screen where at least a section of the touch screen is limited to icons. As such, if a touch is detected sufficiently close to an icon, a touch is reported at the icon. If a detected touch location is sufficiently far from all such areas, then no touch is reported.

In yet another aspect of the present invention, an area of the touch screen may be designated as having a higher probability of having a reported phantom touch due to overlapping touches. For example, if a detected touch location corresponds to a midpoint area of a touch screen that corresponds to an area disposed between two regions intended to be touched by different users, then the detected touch location is subjected to further tests because the midpoint area has a higher probability of having phantom touches than the outer regions. In this case, a detected touch located in the midpoint area can be subjected to further tests for determining whether the touch is a phantom touch, where the variables used in the further tests being adjusted accordingly. For example, the farther away a detected touch location is from the midpoint region, the more relaxed the test conditions because there is a high degree of confidence that the touch is a single touch. Detected touch locations within the midpoint range can be subjected to more stringent conditions.

The details of implementation and application of the methods of the present invention can depend on which technology is used to calculate and report touch locations. Even so, the implementation and application of many of the concepts of the present invention with respect to capacitive, resistive, and force-based touch screens is similar enough that these technologies can be treated similarly in the present invention. Briefly, capacitive touch screens work by measuring the current through each of several terminals (typically located at each of the four corners of the touch panel) when a user touches down. The ratios of the currents can be used to locate where the touch occurred. Resistive touch screens function when a user touches a location of the touch screen with enough force so that two spaced conductive sheets come into local electrical contact at the touch location. By measuring the resistance values between opposing edges and the touch point of one conductive coating and by measuring similar values in the orthogonal direction on the other conductive coating, an X, Y position for the touch location can be determined. Force touch screens utilize sensors located at pre-determined positions, each measuring a component of force due to a touch at a location on the touch screen. By measuring the different forces at strategic locations (e.g., at the four corners), the location of touch can be determined. Examples of sensors suitable for use in force-based touch screens include capacitor elements and piezoelectric devices, among others.

While the signals for determining touch locations differ for each of these three technologies, a total electrical current measurement can be used in each as the signal to distinguish single touches from multiple touches.

FIG. 1 shows an illustrative flow chart that identifies various steps that can be used in capacitive, resistive, and force-based touch screen systems to distinguish single touches from multiple touches. After making a new measurement from which position data and signal magnitude can be calculated, any of a number of tests, or decision steps, can be performed. Although several of these decision steps is shown in FIG. 1, methods of the present invention can be suitably implemented that include any one of these decision steps without applying the others, that include any combination of one or more of these decision steps, and that include them in any order. Other decision steps, algorithms, measurements, and calculations can also be made.

Upon making a new measurement, it may be beneficial to determine if the calculated X, Y position falls in a midpoint area or other region where phantom touches due to double touch events are more probably located. This information can be used to tighten or loosen various test parameters used in subsequent decision steps.

As another decision step, the appropriate signal (for example, total current passing through a designated point or points) can be compared against the minimum threshold for a single touch. As long as the signal does not rise above this minimum threshold, no touch is registered. If the signal rises above the minimum threshold, it is compared against the maximum threshold for a single touch. If the signal is less than the maximum single touch threshold, the position of the touch can be calculated and reported from the appropriate set of measurements. If the signal exceeds the maximum single touch threshold, the signal is interpreted as a double touch, and position data for the touch is not reported. However, data from unreported double touches can be stored and a new measurement can be made. If the signal later drops below the maximum threshold but remains above the minimum threshold, a new touch position can be reported. At that time, the system can determine what should be done with the stored data from the overlapping double touch event. Storing and using unreported double touch data is an optional step that can be performed after any decision step where an overlapping touch has been indicated.

Referring again to FIG. 1, another step includes monitoring the rate of change of a signal magnitude. If the rate of change of magnitude exceeds a threshold, this can indicate a double touch or unstable touch. If the touch is stable and the rate of change is less than a threshold, a position can be reported. Similarly, the rate of change of calculated position from one measurement to the next can be monitored to determine whether a double touch has likely occurred. As another step, it can be determined whether the calculated X, Y position corresponds sufficiently closely with a predetermined active area, such as an icon. If so, valid touch coordinates may be reported. If more than one of the decision steps shown in FIG. 1 are used in a method of the present invention, it may provide a higher level of confidence that reported touch locations are valid.

As indicated above, measurement data from overlapping touches can be stored even though no valid touch location was able to be reported. The stored data from the double touch can later be used. For example, if a new measurement is determined to be a double touch, no touch is reported, but the measurement data can be stored. If the double touch was immediately preceded by a reported single touch that can be attributed to one of the touches of the double touch, the measurement data from the previously reported touch location can be subtracted out of the double touch measurement data so that a second touch position can be calculated and reported, in essence backing out a valid touch location that was otherwise hidden in double touch data. If there was no reported single touch in the preceding measurement, then the double touch data can remain stored and a new measurement can be made. If the new measurement is a reported single touch, the system can check to see if the immediately preceding measurement was an unreported but stored double touch. If so, the new single touch data can be subtracted out of the stored double touch data in order to calculate the previously unreported single touch that overlapped with the newly reported single touch.

The new position data, calculated by subtracting out known valid signals from adjacent double touch signals, can optionally be checked for proximity to known icon positions (or other active area positions of the touch screen). This can give further confidence that the backed-out position is valid, especially in situations where the measured signal levels tend to vary somewhat over time.

Figure 2:
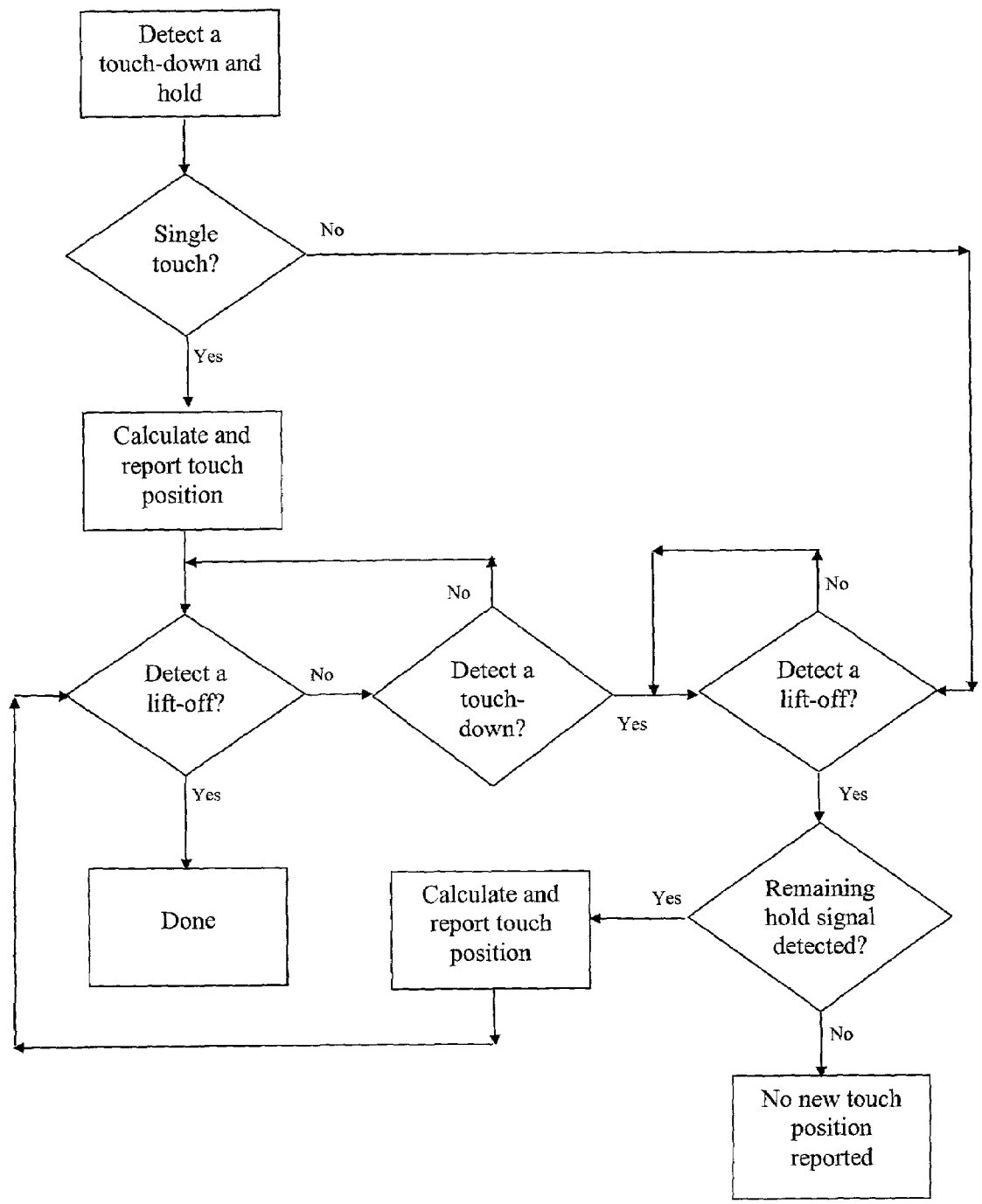
FIG. 2 is a flow chart representing decision steps that can be used in methods of the present invention.

FIG. 2 demonstrates a decision tree that may be employed when using rate of change of signal magnitude to determine the presence and order of touch-downs and lift-offs of successive touch events. Once a touch is detected due to a touch-down followed by a hold, the system can check threshold data to determine if the magnitude of the hold signal corresponds to a single touch. If it is a single touch, the position can be calculated and reported. If the touch-down is a simultaneous double touch-down, then it is not a single touch, and the system waits to detect lift-off events to calculate and report any position. Again, if the original touch-down is due to a single touch, the position is reported. The system then checks to see if the next event is a lift-off (signifying the end of the single touch, and thus no overlapping touches) or if the next event is another touch-down (signifying overlapping touches). If the next event is another touch-down, then the system loops until a lift-off is detected. If the next event is a lift-off, and a hold signal remains after the lift-off, that means there is still another touch that has not lifted off, and the position of that remaining touch can be calculated. If no hold signal remains, then there were simultaneous lift-offs.

These general steps can be employed as discussed, or in various combinations, or with other steps not shown in FIGS. 1 or 2 in a touch system or method of the present invention to distinguish multiple touch events from single touch events. Specific examples of the implementation of these and other steps are detailed in the discussion that follows.

As previously discussed, total measured current can be used as the signal to distinguish between single and double touches in capacitive, resistive, and force-based touch panels. With that in mind, it is instructive to consider the scenarios presented in FIGS. 3A through 3G which schematically illustrate graphs of total measured current, $\Sigma I$, versus time for seven different situations where one or two users touch a sensor in various sequences. Equivalently, FIG. 3 applies when a single user applies one or two touches according to the various sequences.

Figure 3A:
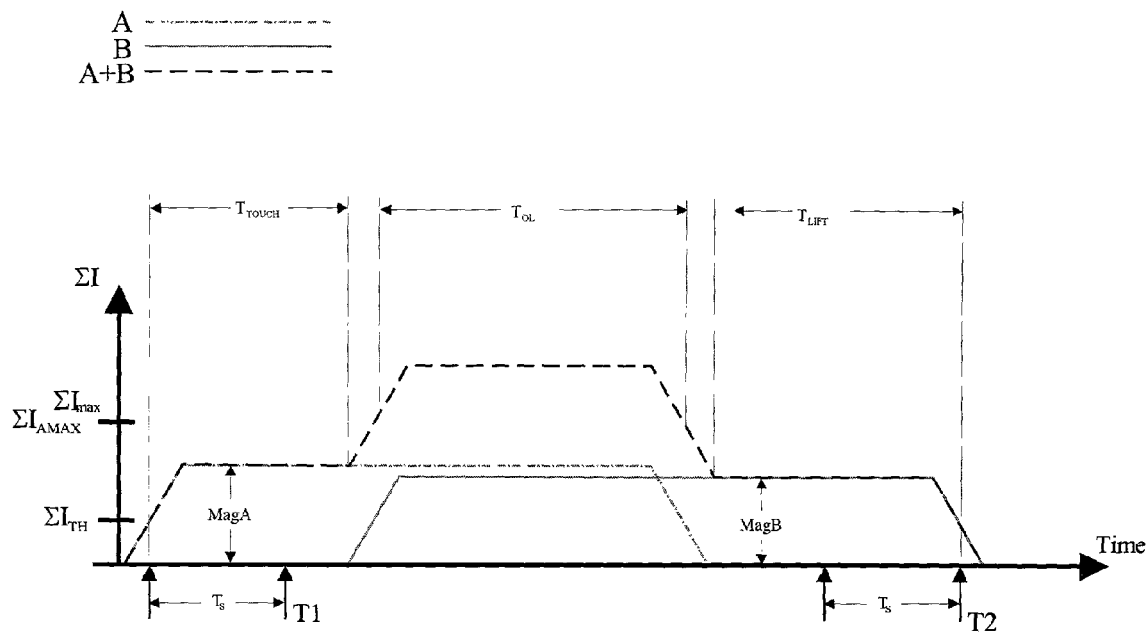
FIGS. 3A-G are graphical representations of various touch input scenarios that may be encountered in touch systems of the present invention.

In FIG. 3A, user A touches first and $\Sigma I$ is of a magnitude greater than $\Sigma I_{TH}$, the minimum threshold for measuring a touch location, but below $\Sigma I_{AMAX}$, where $\Sigma I_{AMAX}$ is greater than a pre-determined maximum current likely to be generated by a single touch from user A. $T_{TOUCH}$ is the time duration during which $\Sigma I$ is between the thresholds $\Sigma I_{TH}$ and $\Sigma I_{AMAX}$. If the duration of $T_{TOUCH}$ is long enough for at least S samples to be taken (at least for a time $T_S$), then A's touch position can be reported at time T1. B touches down at time $T_{TOUCH}$ and $\Sigma I$ rises above $\Sigma I_{AMAX}$ for a duration $T_{OL}$, indicating two overlapping touches. User A then lifts off and $\Sigma I$ returns to a level between $\Sigma I_{TH}$ and $\Sigma I_{AMAX}$ for a duration $T_{LIFT}$. Then B lifts off and $\Sigma I$ returns to a level below $\Sigma I_{TH}$. If $T_{LIFT} > T_S$, a valid single touch can be measured and B's touch position can be reported at time T2. Thus both A's and B's touch positions can be reported correctly. Exemplary values of time $T_S$ are in the range of about 4 to 20 milliseconds. For a typical application where a virtual button or icon is touched, a total touch time for a single user is typically in a range of about 20 to 80 milliseconds.

Figure 3B:
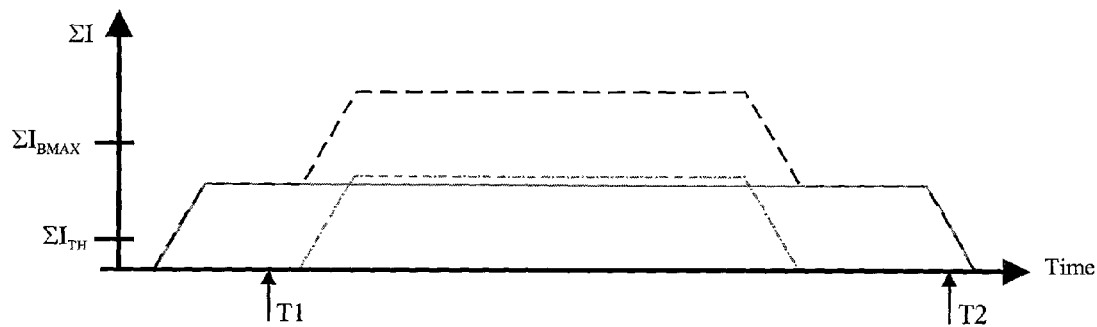

FIG. 3B schematically shows a sequence where B touches first, then A touches, then A lifts off, then B lifts off. The durations of $T_{TOUCH}$ and $T_{LIFT}$ are long enough so that S samples can be taken when B alone is touching. As such, valid touches of B's location can be reported at both T1 and T2. The phantom location is not reported.

Figure 3C:
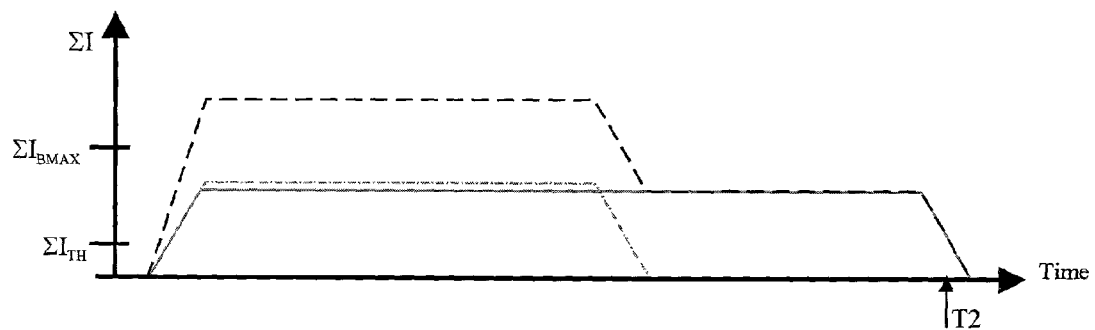

FIG. 3C schematically shows a sequence where A and B touch down simultaneously, then A lifts off, then B lifts off. The duration of $T_{LIFT}$ is long enough so that S samples can be taken when B alone is touching, so a valid touch of B's location can be reported at T2. The phantom location is not reported since while A is touching $\Sigma I$ is larger than the maximum value for a valid single touch.

Figure 3D:
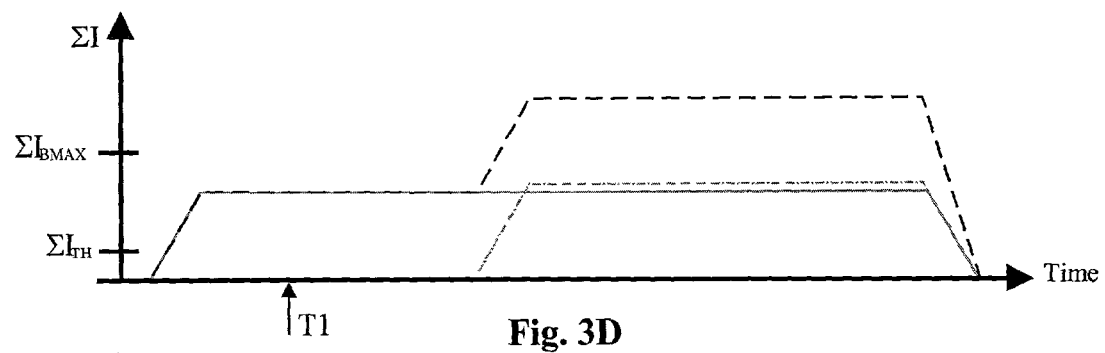

FIG. 3D schematically illustrates the reverse of the sequence shown in FIG. 3C. In FIG. 3D, user B touches first, with sufficient $T_{TOUCH}$ time to measure the position of B's touch, which can be reported at time T1. Then A touches, then A and B lift off nearly simultaneously. There is insufficient $T_{LIFT}$ time for a second valid position to be generated, and the phantom location is not reported.

Figure 3E:
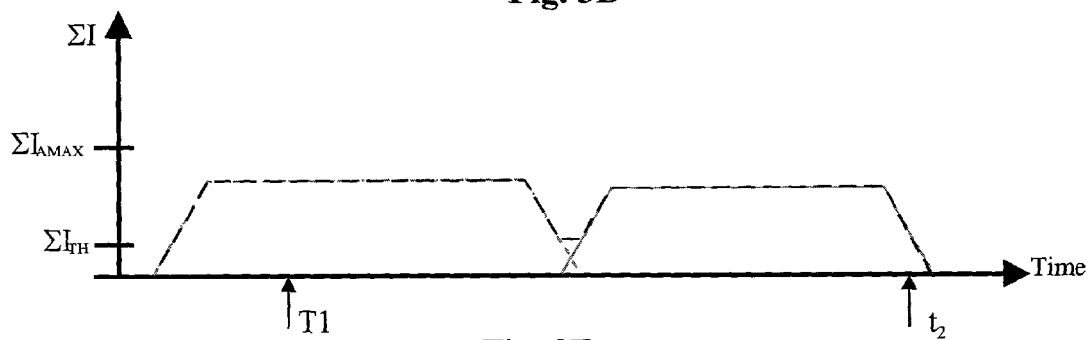

FIG. 3E shows a sequence where A touches first, then B touches and A lifts off almost simultaneously, then B lifts off. $T_{TOUCH}$ and $T_{LIFT}$ are long enough so that S samples can be taken when A and when B are each touching alone, thus valid touches can be reported for A at time T1 and then for B at time T2.

Figure 3F:
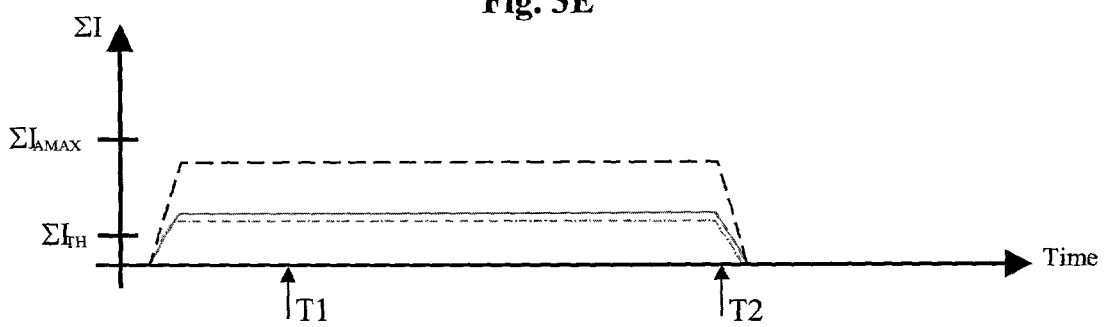

FIG. 3F shows A and B touching down almost simultaneously, then lifting off almost simultaneously. In this particular case, $\Sigma I$ is shown to be above the threshold $\Sigma I_{TH}$ but below the pre-determined maximum current for a single touch. As a result, a valid touch may be reported at times T1 and T2, both of which would be in error because phantom positions located somewhere between A's touch and B's touch would be reported. Such a situation can be accounted for in various ways, for example by determining whether the reported touch position lies in an inactive area or lies in a region where double touches are more probable. If so, reporting of the touch point can be conditioned on subjecting the measurements to further tests, or can be wholly avoided. If it is determined from further tests, or otherwise, that such a situation represents another touch, this may serve as a cue for the system to recalibrate threshold levels.

Figure 3G:
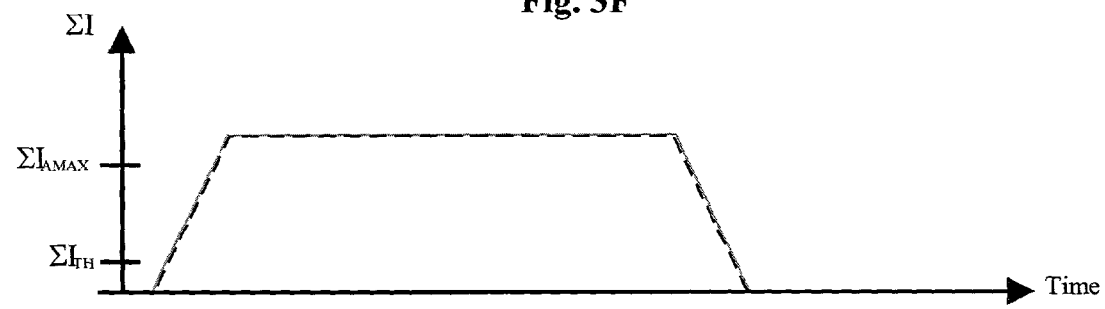

FIG. 3G shows a case where user A alone touches, but the magnitude $\Sigma I$ of A's touch is above the threshold $\Sigma I_{AMAX}$ so that no valid touch is reported. This result is in error, since A touched alone. This error case can be mitigated by the addition of further logic. For example, if two sequential touch events such as shown in FIG. 3G are detected, then the position of the second touch event may be calculated and recorded with a high degree of certainty that it is a real touch and not a phantom touch due to overlapping signals. This relies on the assumption that the probability is negligible for two touches to occur nearly exactly simultaneously in touchdown, hold, and lift-off twice in a row. In addition to registering the second of such sequential events, the measurement can be used to modify the threshold values. This scenario will be considered again in more detail in connection with FIGS. 6 and 7 below.

The cases schematically shown in FIG. 3F and FIG. 3G may result when $\Sigma I$ changes significantly and rapidly, for example due to large changes in touch force, large changes in touch impedance of a user and/or a user's body to ground impedance, or the like. Frequent recalibration of the threshold values may minimize the occurrence of FIG. 3F and FIG. 3G type situations.

Methods and systems of the present invention are described in further detail, and with reference to specific touch sensor technologies, in the discussion that follows.

Figure 4:
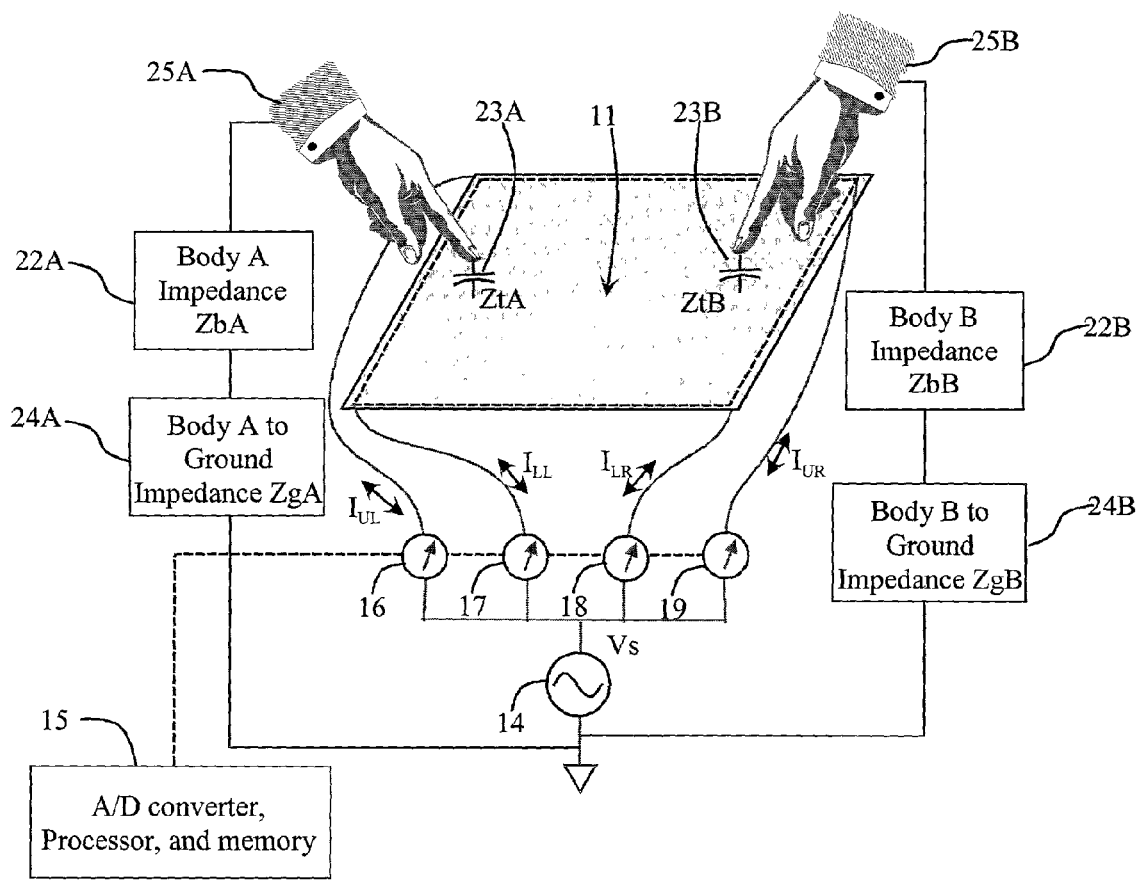
FIG. 4 is a schematic representation of a capacitive touch screen being touched at two locations.

FIG. 4 schematically illustrates a capacitive touch system comprising a sensor 11, a power supply 14, and supporting electronics 15. Power supply 14 is connected to a common ground. When a single user 25A touches sensor 11 at location A, currents flow from power supply 14 through each of the four corners of the sensor, through the user and into the ground, the sum of which currents is designated $\Sigma I$. The touch position can be determined by calculating the ratios of currents flowing through each of the four corners of the sensor. In general, the measured touch position is, to a large extent, independent of the total current flowing through the power supply, and the magnitude of the power supply. The touch location is generally and to a large extent only a function of the ratios of the currents flowing through the four corners of sensor 11.

When a second person 25B touches the sensor at a location B while person 25A is holding, the overall current flowing through the power supply, as well as the four currents flowing through the four corners of the sensor generally increase. When the algorithm used for calculating the position of a single touch is used to measure the touch location of the double touch signal, the detected touch location is a phantom touch that is positioned somewhere between locations A and B. Thus, when two users touch simultaneously, the measured touch position is incorrect because the system effectively calculates the average of the two touched positions. The measured touch location, in general, is a function of the individual currents flowing through each user and the different impedances present in the circuit including the contact impedance for each user. As a result, the measured touch position is generally unstable because it changes with typical variations in impedance and touch current. The instability can be significant because the total current may change by more than a factor of 10 during touchdown and lift-off.

According to the present invention, the presence of two simultaneous or overlapping touches may be detected by measurement of touch parameters. Specifically, according to the present invention, the magnitude of the total current $\Sigma I$ flowing through the power supply may be used to detect the presence of overlapping touches. Since different users may vary significantly in their touch current, it is helpful if each user calibrates their touch signal magnitude by touching sensor 11 prior to normal use. This information can then be used to set threshold values for distinguishing single touches from double touches. Alternatively, individual touchers' current levels may be measured during normal use, and thus the threshold levels can be updated over time.

Figure 5:
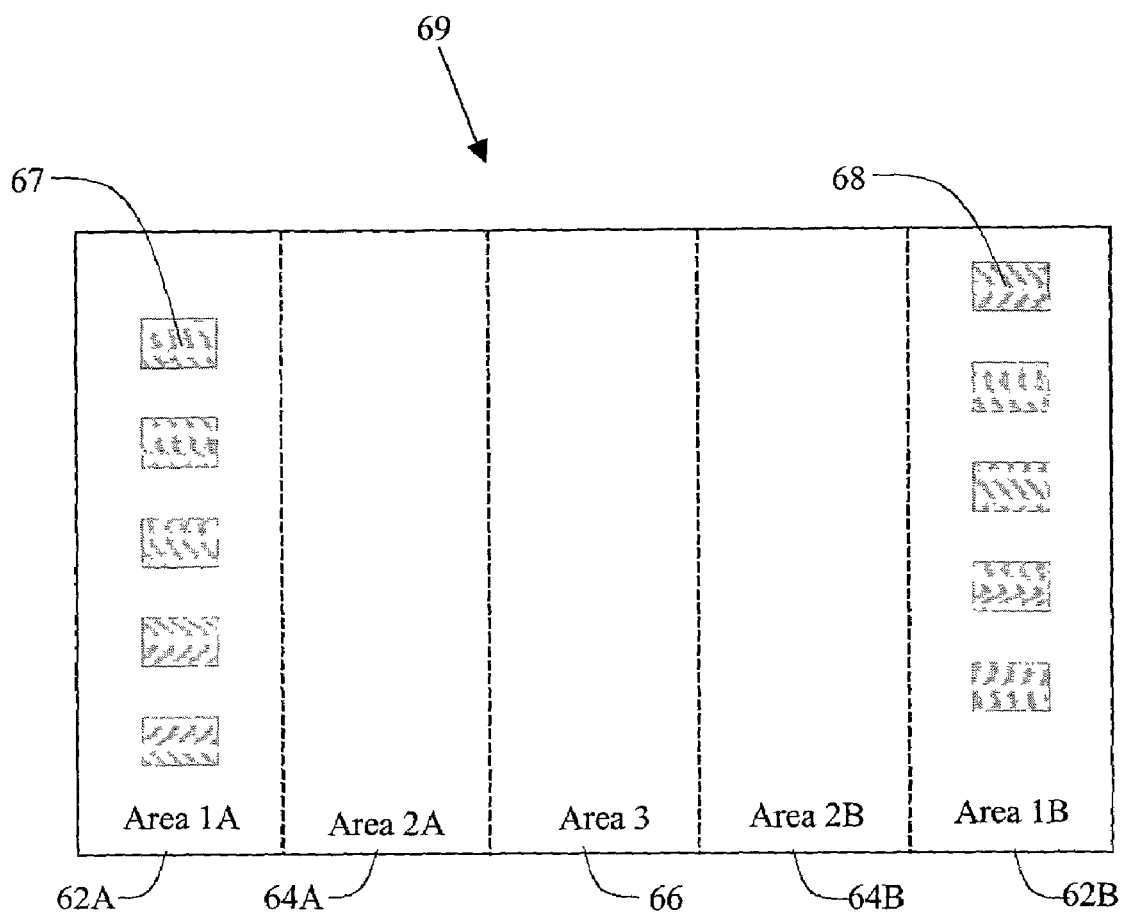
FIG. 5 illustrates defining areas on a touch screen for use in a discrimination step in methods of the present invention.

The determination of the location of a valid touch may also be dependent on the image format displayed through a touch screen. For example, as schematically illustrated in FIG. 5, an image shown on a display located behind a transparent touch screen 69 may represent two columns of virtual button icons 67 and 68, located in area 62A and area 62B, respectively. Where the intent is for touch input to be applied to areas of touch screen 69 that correspond to icons 67 or 68, any touch applied or measured elsewhere, such as in areas 64A, 64B, or 66, may indicate an invalid touch or a phantom touch. Therefore, any touch measured in areas 64A, 64B, or 66 has a higher probability of being a false touch. Such a false touch might be a phantom touch resulting from two simultaneous or overlapping touches, one applied on icon 67 and the other applied to icon 68 in areas 62A and 62B, respectively. The proximity of calculated touch locations to fixed areas of the touch screen surface or to movable displayed icons can be used to discriminate valid touches as a stand alone method or as a method combined with other discrimination methods, such as those employing signal magnitude thresholds and/or rates of change thresholds. When used in combination with other methods, icon proximity may be used to modify the analysis of other touch parameters, for example to fine tune multiple touch discrimination ability, as described in more detail later.

In addition to comparing calculated touch locations icon placement (or other active areas), the location of an apparent touch relative to "inactive" areas on a touch screen may provide useful information for discrimination of multiple touches. A capacitive, resistive, or force sensing touch sensor touched in two locations during overlapping time periods will detect a single apparent touch that is between the two touched points. An algorithm based on the layout in FIG. 5 uses this characteristic to advantage in cases where the two touches are limited to opposite halves of the touch screen. For example, a capacitive, resistive, or force sensing touch screen 69 that is touched in area 62A and also in area 62B will yield a measured touch approximately half way between the two touches, for example, in area 66. So any touch measured in area 66 can be inspected further using other parameters to determine if one or two users are touching. However, a touch measured in area 62A (or 62B) is unlikely to be the result of two users touching on opposite sides of touch screen 69, since a second user's touch anywhere on the right side of screen 69 would likely cause the combined measured touch point to be outside area 62A. It is also possible to have an apparent touch location in areas 64A or 64B.

Figure 6:
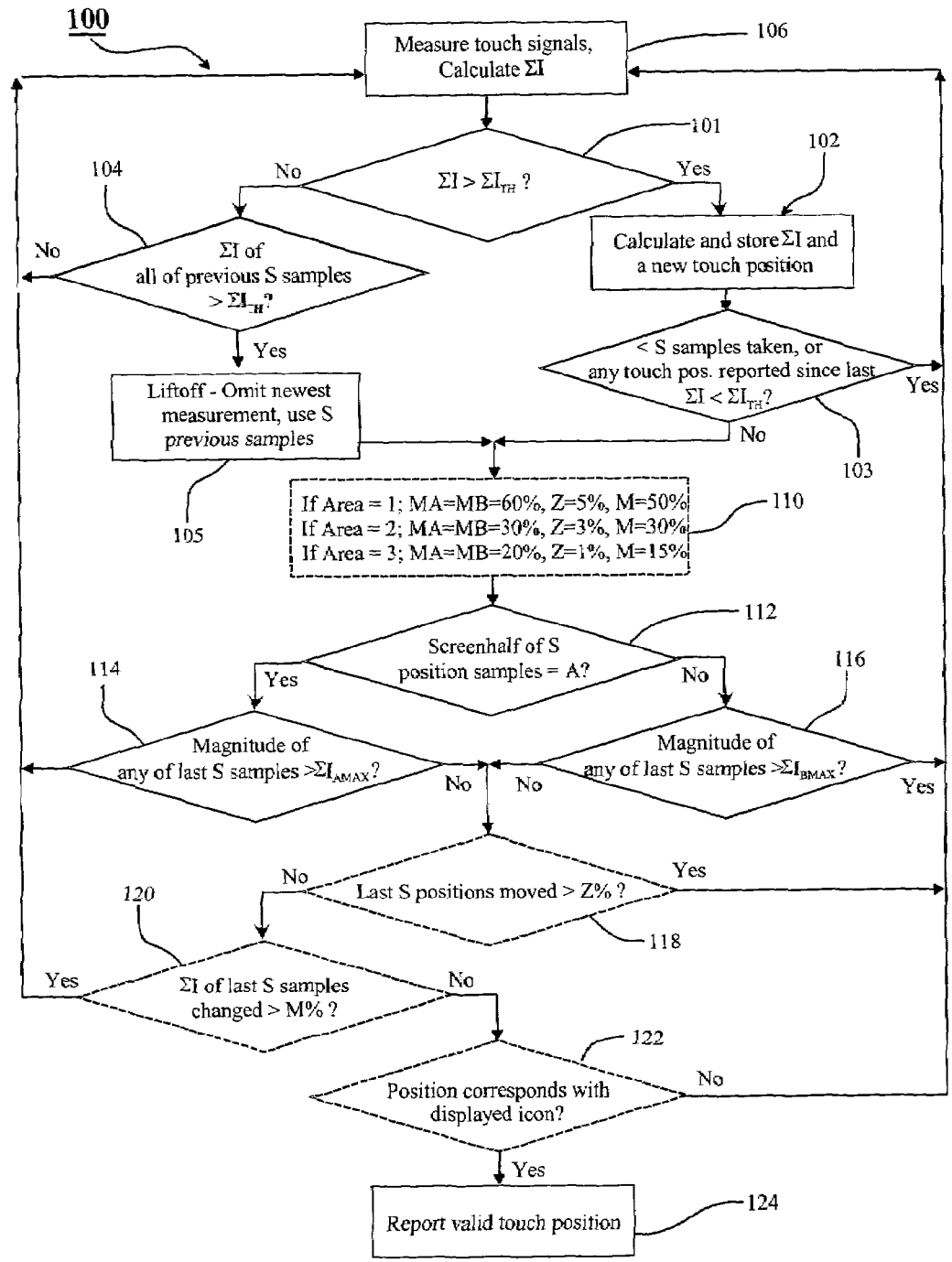
FIG. 6 is a flow chart representing decision steps that can be used in methods of the present invention.

FIG. 6 illustrates an exemplary flow diagram of an algorithm 100 according to an aspect of the present invention. Algorithm 100 discriminates the presence of one touch versus two temporally overlapping touches applied to a touch sensor, and reports a valid touch location when a single touch is determined to have been applied to the touch sensor. In step 106, $\Sigma I$, the total current flowing through the four corners of the touch screen, is calculated. In step 101, $\Sigma I$ is compared to a pre-determined minimum threshold $\Sigma I_{TH}$ to determine if the touch signal has sufficient magnitude to warrant measurement of a touch position. If $\Sigma I$ is large enough, a touch position is calculated and the resulting position is stored, as outlined in step 102. The measurement and calculation steps 106, 101, and 102 are then repeated (S−1) additional times, where S is a pre-determined value, for example 4. If any reading of $\Sigma I$ in step 101 is not greater than $\Sigma I_{TH}$, the magnitude of the previous S samples is reviewed in step 104 to determine if all of them were greater than $\Sigma I_{TH}$. If they were, a lift-off condition is indicated and the most recent measurement (i.e., the measurement that was less than $\Sigma I_{TH}$) is discarded. The previous S samples can then be used to calculate S new touch positions, as outlined in step 105. Step 110 may then be executed, whereby the average of the S positions is analyzed to determine if the measured touch location is in proximity to any of one or more pre-determined areas of the touch screen (e.g., icon regions such as shown in FIG. 5), or if the measured touched location falls within other areas (e.g., inactive areas). The values of certain evaluation parameters in step 110 may be set based in part on the location of the measured touch.

Parameters MA and MB are percentages added to pre-measured values of $\Sigma I_A$ or $\Sigma I_B$, respectively to generate the value $\Sigma I_{MAX}$, the threshold above which a measurement is interpreted as due to overlapping touch inputs. $\Sigma I_{MAX}$ may be different for user A than user B. Z is a percentage of the overall X,Y dimensions of the touch screen. X may be a coordinate axis along the length of the touch screen and may be centered at the center of the touch screen. Y may be a coordinate axis along the width of the touch screen and may be centered at the center of the touch screen. If X and/or Y coordinates of the measured touch position changes more than Z percent during the S touch location measurement, it is assumed that the touch event is unstable or invalid based on the rate of change of position, and no position measurement is reported. M % is a maximum allowed percentage change in parameter $\Sigma I$. If $\Sigma I$ changes more than M % percent during the S measurement samples, it is assumed that the touch event is unstable or invalid and no position measurement is reported. Parameter values shown in step 110 are meant to be illustrative values, and any values suited to a particular application can be used. In step 112, the average of S positions is used to determine if the touch is on the half of the touch screen used exclusively by user A or on the half of the touch screen used exclusively by user B. Depending on which half of the sensor is touched, $\Sigma I$ is designated $\Sigma I_A$ or $\Sigma I_B$, and in step 114 or step 116, a calculation is performed to determine if $\Sigma I_A$ is greater than $\Sigma I_{AMAX}$ or if $\Sigma I_B$ is greater than $\Sigma I_{BMAX}$. As an example, $\Sigma I_{AMAX}$ and $\Sigma I_{BMAX}$ may be determined using the following equations:

$$\Sigma I_{AMAX} = \Sigma I_{ACAL} + MA\ \% \qquad (1)$$

$$\Sigma I_{BMAX} = \Sigma I_{BCAL} + MB\ \% \qquad (2)$$

$\Sigma I_{ACAL}$ and $\Sigma I_{BCAL}$ are previously measured and stored calibration values of a single touch applied by user A and user B, respectively. If $\Sigma I_A$ or $\Sigma I_B$ is above the applicable threshold, two overlapping touches have been detected. As such, the measured position can be interpreted as corresponding to a phantom touch so that no touch position is reported, and new measurements are made. If the value is below this threshold, the S positions are tested to determine if any of them is more than Z % away from any other. If so, the measurement is determined to be moving too much to yield a stable or valid position and no touch is reported, as outlined in step 118. If the S samples are positionally stable, their rate of change of magnitude is evaluated in step 120, where the S samples of $\Sigma I$ are tested to determine if $\Sigma I$ changed more than M % among the S measurements. If $\Sigma I$ changed more than M %, the signal magnitude is determined to be changing too much to yield a stable position and no valid touch is reported. Step 122 may be performed to determine if the touch position is valid, based on its proximity to a known icon location. A touch position measured and reported to be close enough to an icon may be considered valid, whereas a measured touch position that is relatively far from all icons may be considered invalid. In step 124, a valid touch position is reported and may be used by a software application.

In algorithm 100 of FIG. 6, where a decision is made not to report a touch, the unreported touch may be reported to a software application, together with the parameters of the unreported touch, for further analysis by the software application. There may be cases where algorithm 100 may not identify a valid or real touch, but with additional information, the application software may be able to resolve whether the unreported touch contains useful information that may result in a decoupling of the overlapping touch signals so that valid touch positions can be reported.

Figure 7:
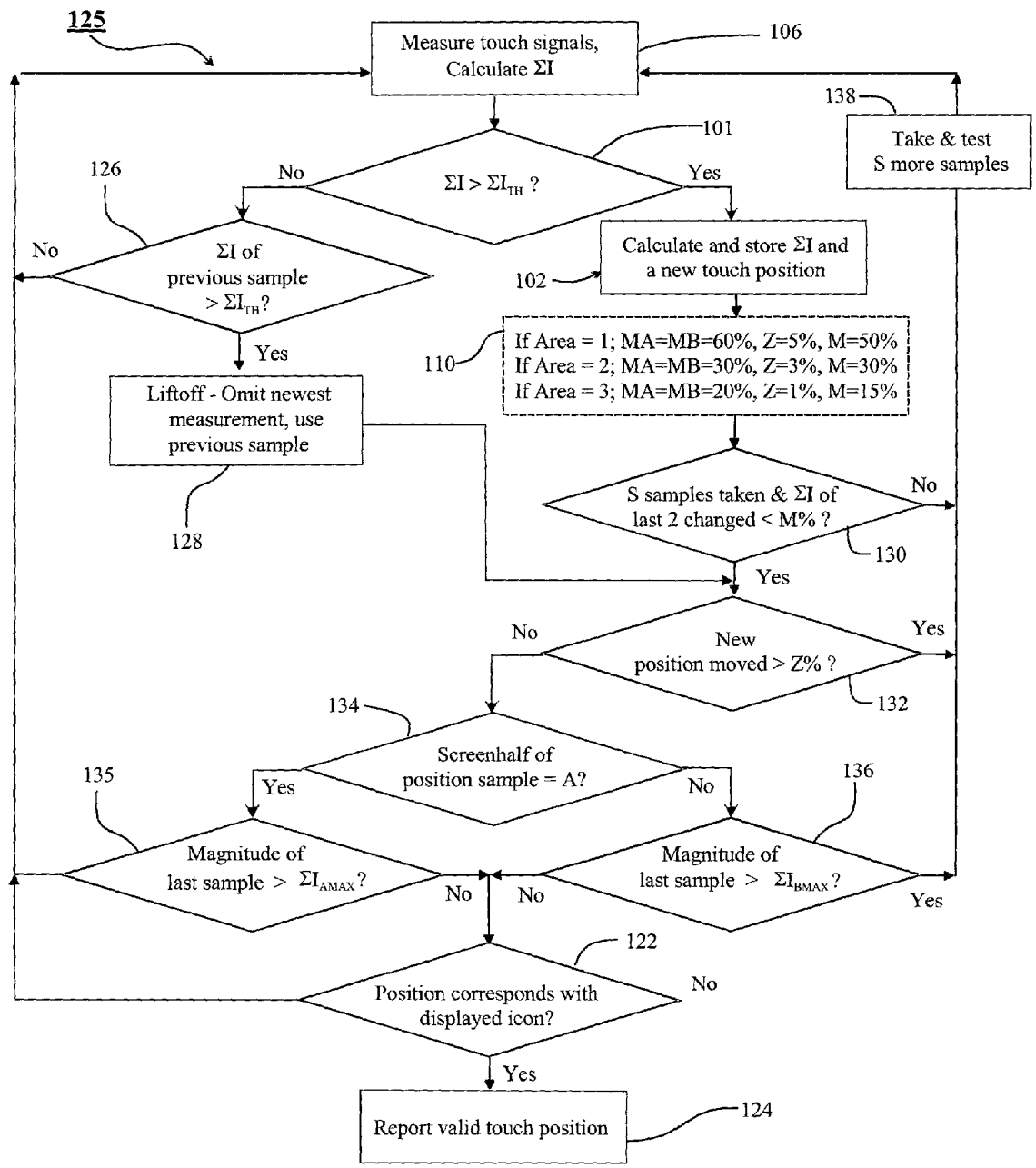
FIG. 7 is a flow chart representing decision steps that can be used in methods of the present invention.

FIG. 7 illustrates an exemplary flow chart of an algorithm 125 according to another aspect of the present invention. Algorithm 125 generally performs many of the steps outlined in algorithm 100 of FIG. 6. In algorithm 125, additional emphasis is placed on the rate of change of the touch magnitude ΣI and on changes in position. In algorithm 125, ΣI for each new sample is calculated, as outlined in step 106, then tested to determine if a touch threshold is exceeded, as outlined in step 101. If the threshold is not exceeded, the previous sample is tested and, if it is above the touch threshold, it is further used, as outlined in steps 126 and 128. If the touch threshold is exceeded by the new sample, ΣI is calculated and X,Y coordinates of a new touch position are calculated, as outlined in step 102. Then, values are assigned to certain variables based on the calculated location of the new touch, as outlined in step 110. The parameter values in step 110 are meant to be illustrative values, and any values suitable for a particular application can be used.

Next, the new ΣI value is compared to the ΣI of the previous sample to determine if the change in ΣI is less than a determined rate of change value M, as outlined in step 130. If the change in ΣI is greater than M, an additional S samples are processed before any valid touch is reported, as outlined in step 138. If the change in ΣI is less than M, then step 132 is executed whereby the X, Y positions of the calculated touch sample are compared to predetermined values to determine if the measured touch position has moved more than a specified amount, designated Z %. If the touch position has moved by more than Z %, step 138 is performed and the process starts again from step 106. If the touch position has moved by less than Z %, the screen-half is determined in step 134, whereby the calculated X, Y position is used to determine if the touch input originated from the half of the touch screen used exclusively by user A or the half of the touch screen used exclusively by user B. Depending on which half of the sensor is touched, ΣI is designated $\Sigma I_A$ or $\Sigma L_B$. In step 135 or step 136, a calculation is performed to determine if the $\Sigma I_A$ is greater than $\Sigma I_{AMAX}$ or if $\Sigma I_B$ is greater than $\Sigma I_{BMAX}$, derived in equation 1 or 2, respectively. If the appropriate $\Sigma I_A$ or $\Sigma I_B$ value is above its respective threshold, two simultaneous or overlapping touches have been detected and no valid position is reported, and new measurements are made. If the appropriate $\Sigma I_A$ or $\Sigma I_B$ value is below its threshold, the calculated position is tested for proximity to a displayed icon (or other specified active region), as outlined in step 122. If correspondence is found with an active region, a valid touch is reported. If not, the process starts again at step 106.

A valid touch position may be measured, and touch inputs from one or two users may be discriminated without executing all of the steps outlined in algorithm 100 of FIG. 6 or algorithm 125 of FIG. 7. In reference to FIGS. 6 and 7, step 110 may, for example, be replaced with fixed values of the parameters MA, MB, Z, and M. As another example, step 118 or 132 may be omitted so the parameter Z is not used, or step 120 or 130 may be omitted so the parameter M is not used. As another example, steps 112, 114, and 116 of algorithm 100 or steps 134, 135, and 136 of algorithm 125 maybe omitted. As another example, step 122 may be omitted. As a further example, an algorithm, according to one aspect of the present invention, may consist of steps 118 and 122, or steps 130 and 132 to discriminate a single touch versus two simultaneous or overlapping touches.

Consider again the situation presented in FIG. 3G where a single touch event is performed, but the signal rises above the single touch threshold. The possibility of error due to such a scenario can be mitigated using algorithms 100 of FIG. 6 and 125 of FIG. 7. In algorithm 100 of FIG. 6, if S samples are rejected based on the criteria $\Sigma I_A > \Sigma I_{AMAX}$, or $\Sigma I_B > \Sigma I_{BMAX}$, for two sequential touch occurrences, separated by a period of time of when $\Sigma I < \Sigma I_{TH}$, then the second sequential occurrence of a FIG. 3G type event will be reported as a valid touch. Alternatively, the second sequential occurrence may be further tested. For example, if step 120 finds that ΣI has changed by more than a specified amount (M %), then step 118 may be repeated with the value of Z reduced, for example by half. If the last S positions have changed in position more than Z/2, (modified step 118) then no valid touch is reported. Otherwise, the positional stability test may override the magnitude instability and a valid touch may be reported. This test takes advantage of the general trend that, in the case of two simultaneous touches, a change in ΣI of either touch results in an appreciable positional change in the measured touch position, whereas, in the case of a single touch, a change in ΣI generally results in an insignificant change in the measured touch position. Either of the two exemplary alternatives described above may be used to address the special case where a user touches a touch screen with a high-magnitude touch signal, then touches the same location again because the touch system did not register the first touch.

Although algorithms 100 of FIG. 6 and 250 of FIG. 7 were described primarily in connection to a capacitive touch sensor, similar algorithms may be used to identify the occurrence of two or more simultaneous or overlapping touches in touch screen systems that use technologies other than capacitive as described below.

Figure 8:
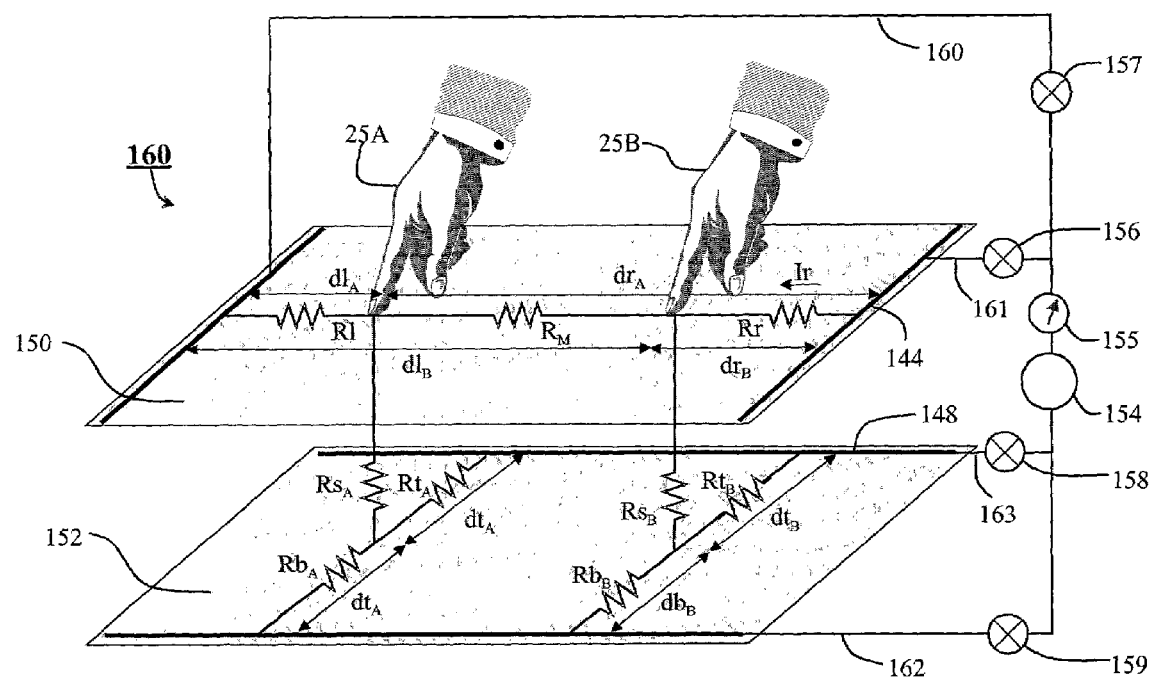
FIG. 8 is a schematic representation of a resistive touch screen being touched at two locations.

One aspect of the present invention is further described in reference to a resistive touch sensor schematically shown in FIG. 8. In FIG. 8, a four wire resistive touch system 160 includes a topsheet 150 and a substrate 152. The topsheet and substrate have resistive coatings on their facing sides. Topsheet 150 is shown in an exploded view separated from substrate 152 for ease of illustration and without any loss of generality. Conductive electrodes 142 and 144 make electrical contact with the resistive surface of topsheet 150. Electrical conductors 160 and 161 connect signals originating from signal source 154 to topsheet 150. Conductive electrodes 146 and 148 make electrical contact with the resistive surface of substrate 152 and conductors 162 and 163 connect signals to substrate 152. When a person 25A touches topsheet 150, the resistive coating on topsheet 150 makes electrical contact with the resistive coating on substrate 152. The horizontal coordinate of the resulting touch position is measured by applying a voltage gradient between electrodes 142 and 144, and measuring the voltage on at least one of electrodes 146 and 148. Similarly, the vertical coordinate of the touch position is measured by applying a voltage gradient between electrodes 146 and 148, and measuring the voltage on at least one of electrodes 142 and 144.

According to the present invention, a presence of a single touch or two or more simultaneous or overlapping touch points may be determined by measuring the total current flows from topsheet 150 to substrate 152 through each of the touch points. Current measurements can be alternated with position measurements. In the example of FIG. 8, it is assumed that where two users 25A and 25B apply touches to touch system 160, user 25A touches the left half of topsheet 150 and user 25B touches the right half. Current may be measured, for example, by applying a voltage source 154, and measuring the resulting current using current measuring circuit 155. A single touch applied by user 25A results in a total current $\Sigma IR_A$ flowing through current meter 155. $\Sigma IR_A$ generally varies depending on the location and surface area of the touch, but typically falls within a consistent range. When two touches are applied during the same time, either from two individual users 25A and 25B each applying a single touch, or from a single user applying touches at two different locations, a total current ΣIR is generated flowing through current meter 155. In general, ΣIR is significantly larger than $\Sigma IR_A$. According to the present invention, two simultaneous or overlapping touches may be discriminated from a single touch by comparing the generated total current with the expected current resulting from a single touch realizing that in general, the total current, ΣIR, is higher when two or more simultaneous touches are applied. ΣIR can vary depending on the location or locations touched on topsheet 150, but there is generally a significant difference between ΣI for one versus two touches. Thus, a threshold $\Sigma IR_{TH}$ may be established above which a measured touch signal may be interpreted as resulting from two or more touches applied in a temporally overlapping manner.

Figure 9:
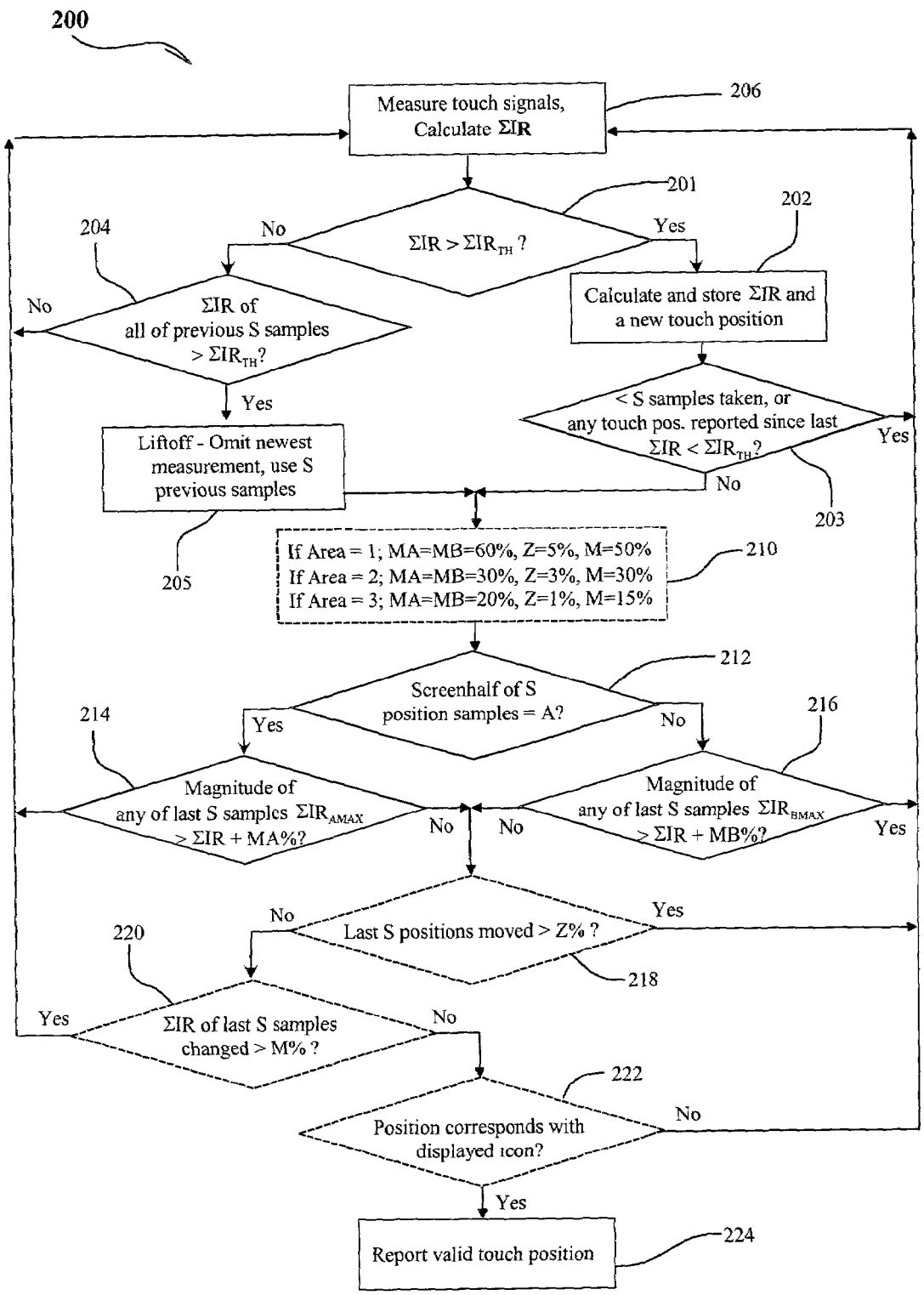
FIG. 9 is a flow chart representing decision steps that can be used in methods of the present invention.

FIG. 9 illustrates an exemplary flow diagram of an algorithm 200 according to one aspect of the invention. Algorithm 200 is in many respects similar to algorithm 100 of FIG. 6. A difference between the two algorithms is that according to algorithm 200, the total current, ΣIR, is the total current that flows between topsheet 150 and substrate 152 of FIG. 8 through all touch points. Other parameters in FIG. 9 are defined in a similar fashion to those in algorithm 100 of FIG. 6. While algorithm 200 is described in connection to the four wire resistive touch panel 160 of FIG. 8, the same or similar algorithm may be applied to five wire, six wire, or eight wire resistive touch screens, for example. A valid touch position may be measured and one or two users discriminated without executing all of the steps outlined in algorithm 200. For example, step 210 may be replaced with fixed values of parameters MA, MB, Z, and M. As another example, step 218 may be omitted so parameter Z is not used, or step 220 may be omitted so parameter M is not used. As another example, steps 212, 214, and 216 may be omitted so parameters MA and MB are not used. An another example, step 222 may be omitted. As another example, under certain conditions steps 206, 218, 220, and 222 may be used to identify an overlapping touch or report a valid touch position.

The present invention can further be applied to a force sensing touch systems in a manner that is analogous to the treatment of capacitive and resistive touch systems described above. Algorithms 100 of FIG. 6 or 125 of FIG. 7 may be applied to discriminate two or more overlapping touches in a force sensing touch screen. For example, co-pending U.S. patent application Ser. No. 09/835,040, entitled "Improved Method and Apparatus for Force Based Touch Input" discloses a force sensing touch screen system in which the manner of measuring touch-based forces includes using capacitive sensors placed at the corners of a rigid overlay. According to the present invention, the total current ΣI flowing through the force sensitive capacitive sensors may be used to discriminate a single touch versus two or more overlapping touches. Parameters MA, MB, Z, M, and displayed icon positions may also be used according to algorithms 100 or 125 to discriminate two or more overlapping touches and report a valid touch position in a force sensing touch screen.

Various concepts have been developed in describing the methods and touch systems of the present invention, each of which relate to discriminating between single touch events and multiple touch events, and between valid touch positions and phantom touch positions. Although applied in somewhat different manners, all of these concepts are suited for analogous implementation in a variety of suitable ways for resistive, capacitive, and force-sensing touch systems. Certain of these concepts are also suited for implementation in other touch screen technologies such as SAW. For example, signal magnitude rate of change information and positional information can be used to discriminate valid touches from phantom touches when temporally overlapping touches are detected in a SAW touch system.

Figure 10:
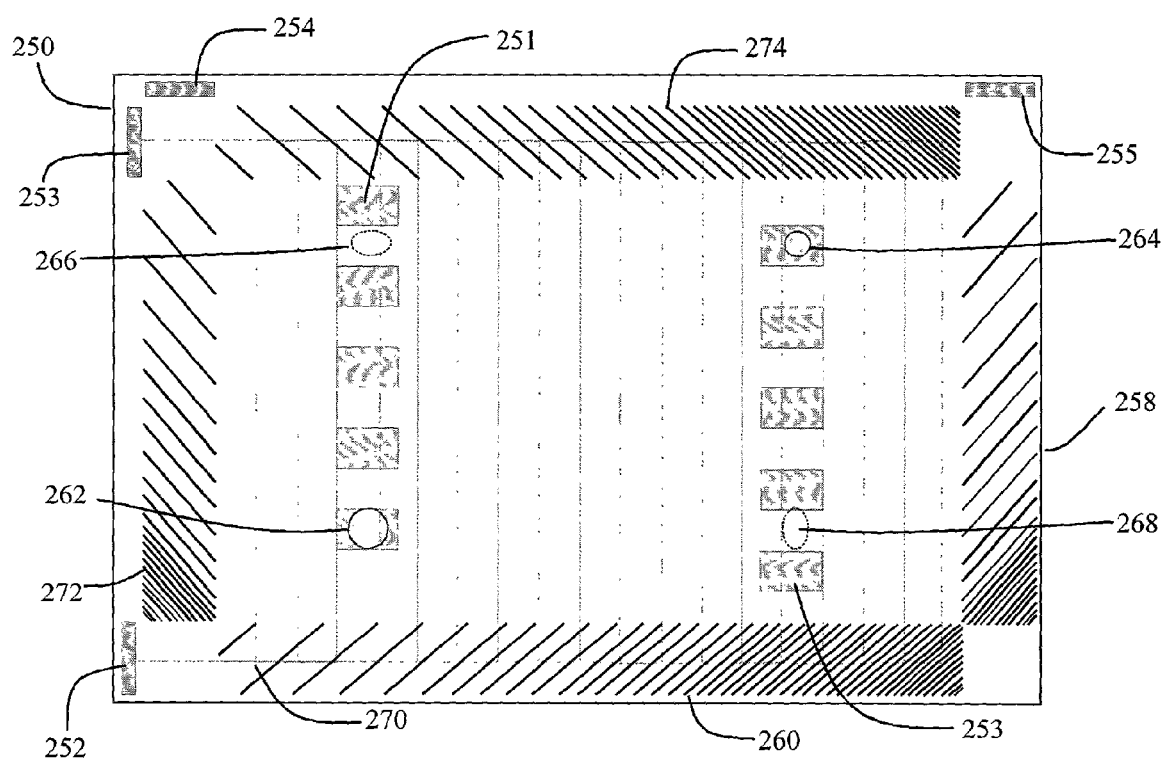
FIG. 10 is a schematic diagram of a surface acoustic wave touch panel.

The operating principles of SAW touch screens are disclosed, for example, in U.S. Pat. No. 6,225,985. FIG. 10 shows a diagram of a SAW touch screen 250. Dashed lines 270 show the paths of acoustic waves which are launched from transmitter 252, then distributed across the surface of the touch screen 250 by a reflecting array 260, then reflected to receiver 253 by another reflecting array 274. At separate times, horizontal waves (not shown) are launched by transmitter 254, then distributed across the surface of screen 250 by a reflecting array 272, then reflected to receiver 255 by another reflecting array 258. Points 262 and 264, touched by an acoustic-absorbing medium such as a finger, attenuate the portion of waves 270 that pass under the touched points.

Figure 11A:
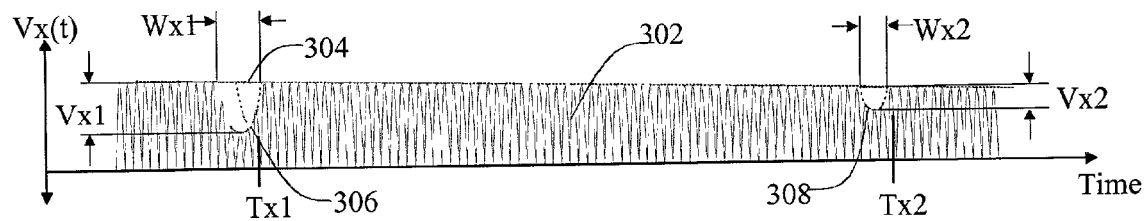
FIG. 11A represents a time varying signal for the X-coordinate as detected in a surface acoustic wave touch panel due to the two locations being touched as indicated in FIG. 10.
Figure 11B:
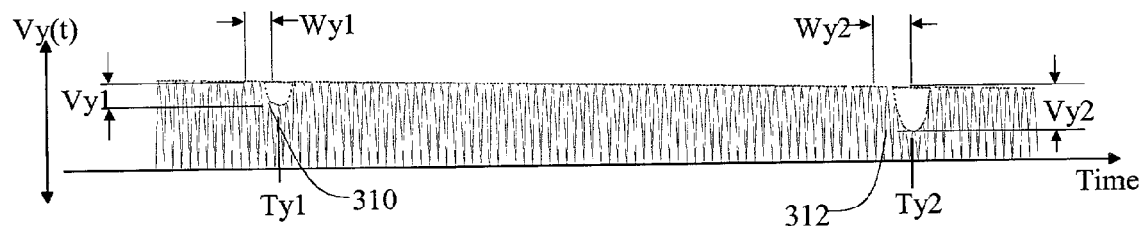
FIG. 11B represents a time varying signal for the Y-coordinate as detected in a surface acoustic wave touch panel due to the two locations being touched as indicated in FIG. 10.

FIG. 11A schematically shows a graph of a signal 302 as received by receiver 253, then amplified and rectified. Prior to an applied touch, a baseline envelope 304 of signal 302 is measured, digitized, and stored in a computer memory. Subsequent deviations such as 306 and 308 from the baseline envelope 304 are analyzed and if their depth Vx or Vy is more than a predetermined threshold level Vth, a touch position is calculated based on the time delay from launch to the center of a measured deviation. Since base line 304 may vary significantly in magnitude over time, Vx and Vy may be expressed as a percent of the baseline level 304 at the point of touch. FIG. 11A shows two deviations of different magnitudes, 306 and 308, indicating two touches in the X dimension. FIG. 11B schematically shows two deviations in the waveform in the Y dimension, 310 and 312, corresponding to the two deviations of FIG. 11A.

By the nature of the detection mechanism, a SAW touch screen can readily indicate a double touch event. However, it is not readily known which X-coordinate goes with which Y-coordinate. As such, there are two valid touches and two phantom touches that still need to be distinguished. This can be done using signal magnitude and signal rate of change information according to the present invention. The basic principle of discrimination is that the X and Y signals for a valid touch point will be similar in their magnitudes and rates of change, whereas phantom points have the X signal characteristics from one user's touch and the Y signal characteristics from the other user, which are not likely to match.

Several parameters may be used to discriminate valid touch points from phantom points. The measured depths Vx1, Vy1, Vx2, and Vy2 and widths Wx1, Wx2, Wy1, and Wy2 of deviations 306, 310, 308, and 312 respectively and the rate of change parameters Vx1/t, Vx2/t, Vy1/t, Vy2/t, Wx1/t, Wx2/t, Wy1/t, and Wy2/t may be used in discriminating valid touch points from their corresponding phantom touch points.

Figure 11C:
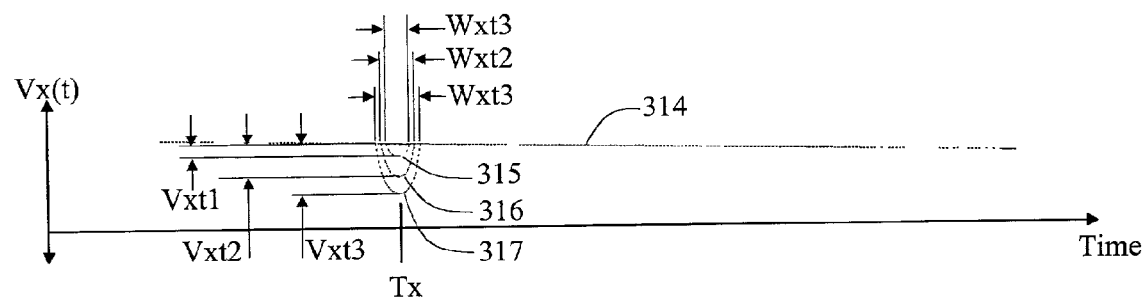
FIG. 11C represents envelopes of a signal like that shown in FIG. 11A as taken at successive time intervals.

FIG. 11C schematically shows an example of a signal Vx(t) envelope where Vx1 and Wx1 vary in magnitude over four sequential samples, as may occur when a person initially touches down onto touch screen 250 of FIG. 10. The four sequential envelopes of signals 314, 315, 316, and 317 may be the result of a user touching with increasing pressure onto touch screen 250 of FIG. 10. Envelope 314 is received just before touch-down. Envelopes 314, 315, 316, and 317 are measured as the touching finger is pressed onto the surface of touch screen 250 of FIG. 10. It can be seen that depth measurement Vx and width measurement Wx increase from zero, corresponding to envelope 314, to Vx1t1 and Wx1t1, corresponding to envelope 315, then to Vx1t2 and Wx1t2, corresponding to envelope 316, then to Vx1t3 and Wx1t3, corresponding to envelope 317.

Rate of change parameters Vx/t, Vy/t, Wx/t, and Wy/t are determined by comparing each new sample of the parameters with the previous samples by using the following equations:

$$Vx/t = Vx/t(\text{new}) - Vx/t(\text{previous}) \quad (3)$$

$$Vy/t = Vy/t(\text{new}) - Vy/t(\text{previous}) \quad (4)$$

$$Wx/t = Wx/t(\text{new}) - Wx/t(\text{previous}) \quad (5)$$

$$Wy/t = Wy/t(\text{new}) - Wy/t(\text{previous}) \quad (6)$$

For the sequence shown in FIG. 11C, values of Vx/t and Wx/t include:

$$Vx/t1 = Vxt2 - Vxt1,$$

$$Vx/t2 = Vxt3 - Vxt2,$$

$$Vx/t3 = Vxt4 - Vxt3, \text{ and} \quad (7)$$

$$Wx/t1 = Wxt2 - Wxt1,$$

$$Wx/t2 = Wxt3 - Wxt2,$$

$$Wx/t3 = Wxt4 - Wxt3; \quad (8)$$

where in general Vx/t3>Vx/t2>Vxt1, and Wx/t3>Wx/t2>Wxt1.

Typically Vx and Vy of a touched point are proportional in magnitude, as are Wx and Wy:

$$|Vxn - Vyn| = Vc < Vmin \quad (9)$$

$$|Wxn - Wyn| = Wc < Wmin \quad (10)$$

Also, the rates of change of signals associated with each touched point are typically about the same, so that:

$$|Vxn/t - Vyn/t| \approx 0 < V/tmin \quad (11)$$

$$|Wxn/t - Wyn/t| \approx 0 < W/tmin \quad (12)$$

Where Vmin, Wmin, V/tmin, and W/tmin are pre-determined values. Vx, Vy, Wx, Wy, Vx/t, Vy/t, Wx/t, and Wy/t values for a phantom point are comprised of Vx, Wx, Vx/t, and Wx/t measured from one of the touched points and Vy, Wy, Vy/t, and Wy/t measured from the other. If any of the measured parameters resulting from the two touched points 262 and 264 are sufficiently different from one another, (i.e. if the difference exceeds values Vmin, Wmin, V/tmin, or W/tmin) then touch points 262 and 264 can be discriminated from phantom points 266 and 268 by comparing these parameters according to algorithm 350, shown in FIG. 12.

Figure 12:
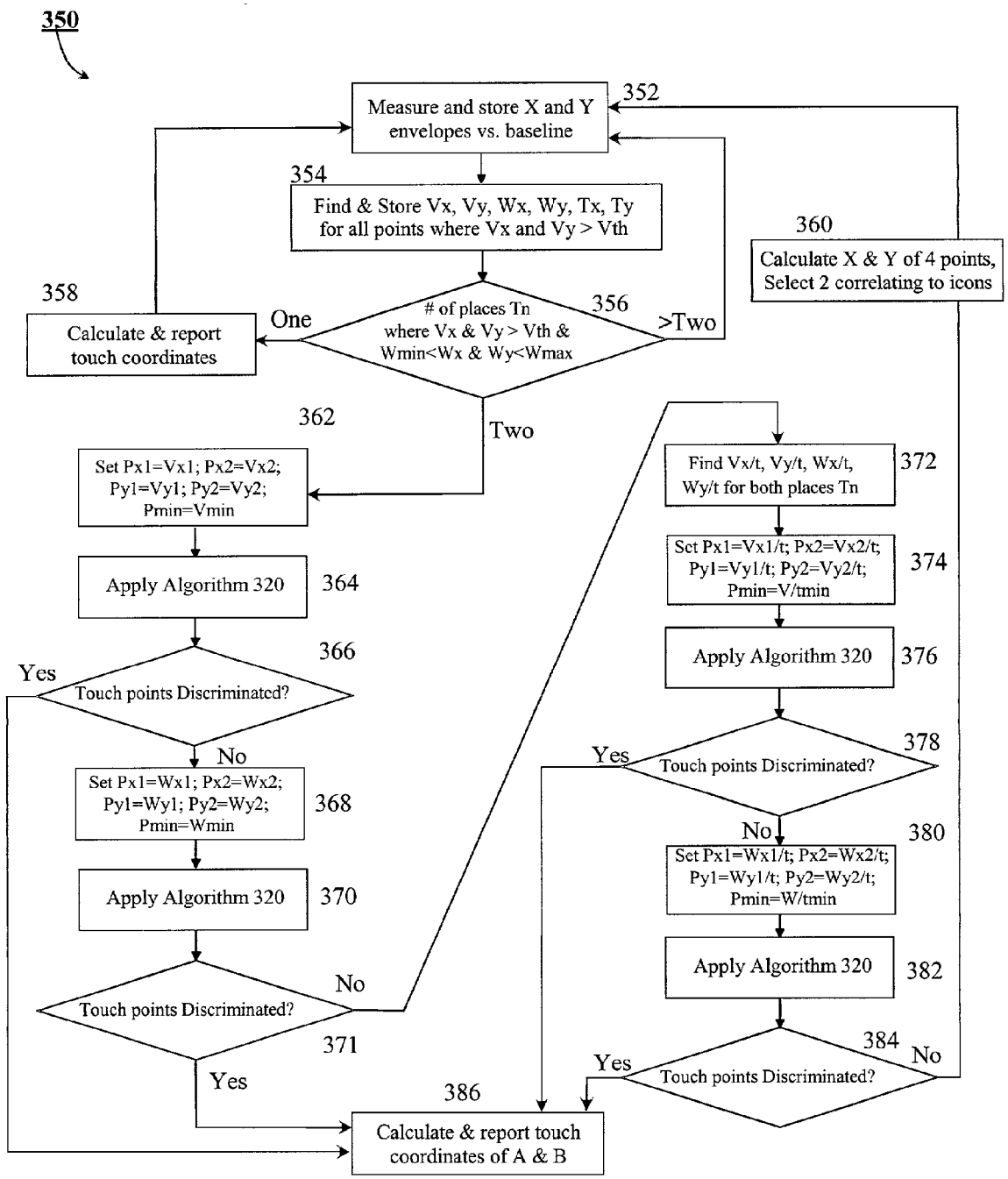
FIG. 12 is a flow chart representing decision steps that can be used in methods of the present invention.
Figure 13:
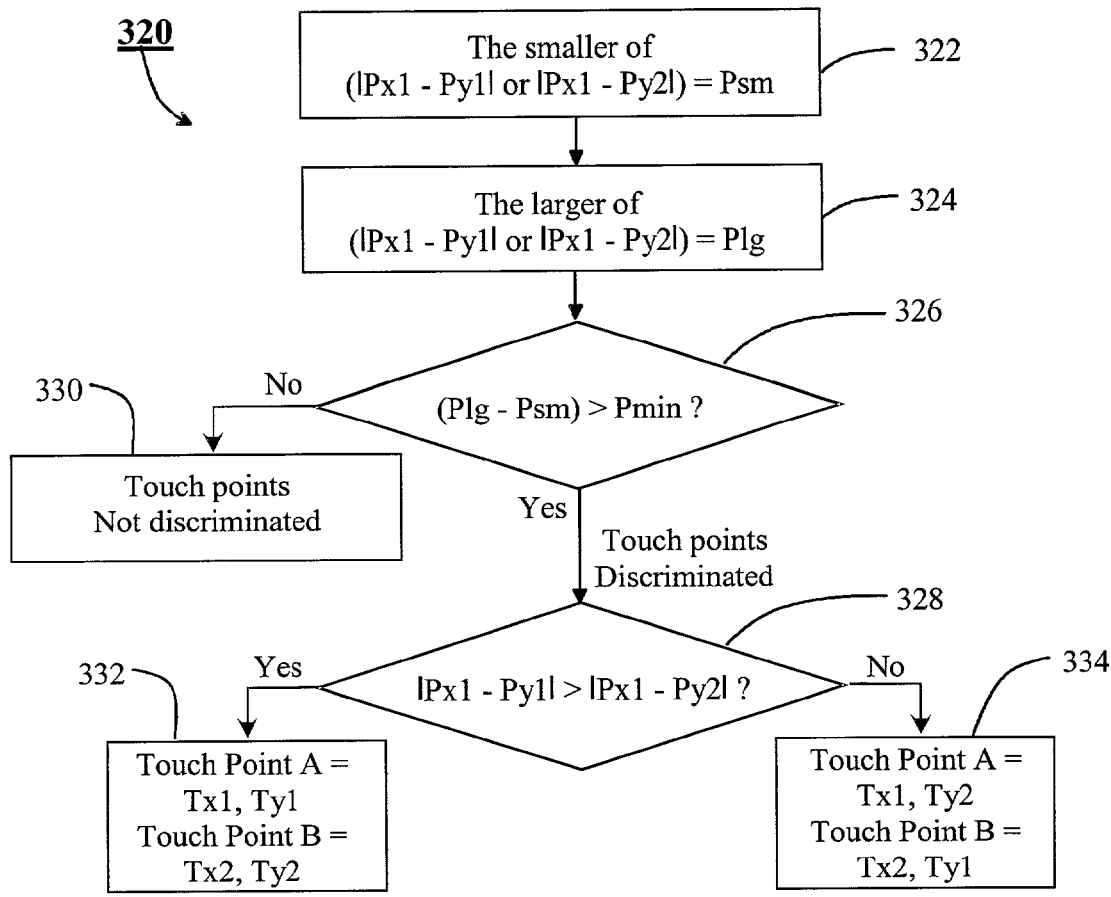
FIG. 13 is a flow chart representing decision steps that can be used in methods of the present invention.

FIGS. 12 and 13 illustrate an exemplary flow diagram of an algorithm 350 according to one aspect of the invention. Algorithm 350 uses parameters Vx, Vy, Wx, Wy, and rates of change of these parameters Vx/t, Vy/t, Wx/t and Wy/t, and also checks for proximity of the measured points to icon locations (or other discrete active areas) to discriminate among multiple touch points. First, measurements are made of X and Y envelopes versus a baseline stored in memory as outlined in step 352. Then changes in the newest measurements are calculated relative the previous baseline, and where parameters Vx, Vy are found to be above a predetermined threshold Vth, parameters Wx, Wy, Tx, and Ty of a touched point are calculated, as outlined in step 354. In step 356, the number of points are calculated where Vx and Vy are greater than Vth, and where the conditions Wmin<Wx<Wmax and Wmin<Wy<Wmax are satisfied (Wmin and Wmax are predetermined values). If a point is found, then the times Tx and Ty, which correspond to measured deviations, can be used to calculate coordinates X and Y of the touched point in step 358, and the process begins again from step 352. If more than two points are found, then discrimination is not possible and the process begins again from step 352. If two touched points are found in step 356, then parameters Vx and Vy are equated to corresponding Pnn values in step 360 for use in discrimination algorithm 320 of FIG. 13. In step 362, algorithm 320 is executed.

FIG. 13 shows an algorithm 320 wherein X and Y components of various parameters are compared to discriminate valid touch points from phantom touch points. In step 322, the magnitude of a parameter of the first X deviation, (306 in FIG. 11A) is compared with Y deviations 310 and 312. The smaller difference is designated Psm. In step 324, the larger of the differences between the deviations is designated Plg. In step 326, if (Plg−Psm)>Pmin, then it may be possible to discriminate phantom points from valid points based on the difference, and step 328 is executed. Otherwise step 330 indicates that touch points cannot be discriminated based on the parameter tested. In step 328, the differences in parameter magnitudes between the first X deviation 306 and Y deviations 310 and 312 are used to select the best match, which indicates which of 310 or 312 is the matching Y coordinate for X deviation 306. If the parameter of deviations 304 and 310 match in magnitude, step 332 indicates that one touch point will have coordinates based on deviations occurring at times Tx1 and Ty1, and the second coordinates will be based on the deviations at times Tx2 and Ty2. Otherwise, step 334 indicates that one touch point has coordinates based on times Tx1 and Ty2 and the other corresponds to times Tx2, Ty1.

If step 364 determines that touch points were discriminated by algorithm 320 operating on Vx and Vy parameters in step 362, then step 386 is executed to calculate X and Y coordinates of two touch points from the appropriate time measurements Tx1, Tx2, Ty1, and Ty2, and the resulting coordinates are reported. If discrimination was unsuccessful, then in step 366 parameters Wx and Wy are equated to corresponding Pnn values for use in discrimination algorithm 320, and in step 368, algorithm 320 is executed again with Wx and Wy parameters. If step 370 determines that touch points were discriminated by step 368 operating on Wx and Wy parameters, then step 386 is executed. If discrimination was unsuccessful, then in step 372 parameters Vx/t, Vy/t, Wx/t, and Wy/t are calculated. Then in step 374 Vx/t and Vy/t parameters are equated to corresponding Pnn values for use in discrimination algorithm 320, and in step 376, algorithm 320 is executed. If step 378 determines that touch points were discriminated by step 376 operating on Vx/t and Vy/t parameters, then step 386 is executed. If discrimination was unsuccessful, then in step 380 Wx/t and Wy/t parameters are equated to corresponding Pnn values for use in discrimination algorithm 320, and in step 382, algorithm 320 is executed. If step 384 determines that touch points were discriminated by step 382 operating on Wx/t and Wy/t parameters, then step 386 is executed. Otherwise, discrimination based on signal parameters failed and step 360 is executed wherein the X and Y coordinates of the four possible touch points 262, 264, 266, and 268 are calculated. Then, if positions of two diagonally displaced touch points are found to correlate with icon positions and the other two locations do not, the two icon-correlated locations may be reported as the valid touch points.

This process is further described with reference to FIG. 10 where a column of five virtual button icons 251 are located on the left side of touch screen 250 and a column of virtual button icons 253 are located on the right side. Icons 251 and 253 are displayed through transparent touch screen 250, intended for the simultaneous use of two users or for dual touch use by a single user. Icons 251 are offset vertically from buttons 253, such that a touch point on an icon in column 251 will not be aligned with the icons of column 253. Thus, valid touches 262 and 264 to the lower left icon and upper right icon respectively can be discriminated from phantom points 266 and 268 by the fact that the phantom points are not in proximity with any icon. This discrimination method may be applied in both horizontal and vertical dimensions, or in both dimensions simultaneously. Following execution of step 360, step 352 is executed to re-start the process.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

Each of the patents, patent documents, and publications cited above is hereby incorporated into this document as if reproduced in full.

We claim:

1. A method for distinguishing between two or more temporally overlapping touch inputs in a touch screen system comprising:
   (a) measuring signals caused by the two or more touch inputs;
   (b) measuring positional data for the touch inputs;
   (c) determining whether any of the signals exceeds a minimum threshold for a single touch input;
   (d) determining whether any of the signals exceeds a maximum threshold for a single touch input;
   (e) Calculating and reporting to the touch screen system a touch location using positional data that corresponds to any of the signals that exceeds the minimum threshold but that does not exceed the maximum threshold; and
   Wherein different minimum and maximum threshold values can be assigned to different users.

2. The method of claim 1, further comprising the step of subtracting the positional data used in step (e) from positional data corresponding to any of the signals that exceeds the maximum threshold to calculate a touch location unreported by step (e).

3. The method of claim 1, further comprising determining which portions of the total signal correspond to touch-down, hold, and lift-off events of the two or more overlapping touch inputs.

4. The method of claim 1, further comprising the step of calculating and reporting a touch location when two sequential performances of steps (a) through (e) both result in no touch location being reported due n the signals exceeding the maximum threshold.

5. The method of claim 1, wherein at least one of the minimum and maximum thresholds are determined from a calibration step.

6. The method of claim 1, wherein the minimum and maximum thresholds comprise preset values.

7. The method of claim 1, wherein at least one of the minimum and maximum thresholds are updated during normal use of the touch screen system.

8. The method of claim 1, wherein at least one of the minimum and maximum thresholds are updated based on user touches within a designated region.

9. The method of claim 1, wherein the total signal is a total electrical current measurement.

10. The method of claim 1, wherein the touch screen system comprises a capacitive touch screen.

11. The method of claim 1, wherein the touch screen system comprises a resistive touch seven.

12. The method of claim 1, wherein the touch screen system comprises a force-based touch screen.

13. The method of claim 1, wherein a touch location is reported in step (e) only if the touch location calculated in step (e) is contained within an area of the touch screen designated as a valid touch area.

* * * * *

UNITED STATES PATENT AND TRADEMARK OFFICE
CERTIFICATE OF CORRECTION

PATENT NO. : 7,254,775 B2
APPLICATION NO. : 09/970474
DATED : August 7, 2007
INVENTOR(S) : Bernard O. Geaghan It is certified that error appears in the above-identified patent and that said Letters Patent is hereby corrected as shown below:

Drawings

Sheet 4, Fig. 3E; delete "$t_2$" and insert -- T2 -- therefor.

Column 8

Line 40; delete "comers" and insert -- corners -- therefor.
Line 54; delete "comers" and insert -- corners -- therefor.

Column 12

Line 12; delete "comers" and insert -- corners -- therefor.
Line 15; delete "comers" and insert -- corners -- therefor.
Line 21; delete "comers" and insert -- corners -- therefor.
Line 25; delete "comers" and insert -- corners -- therefor.

Column 13

Line 43; delete "comers" and insert -- corners -- therefor.

Column 15

Line 59; delete "maybe" and insert -- may be -- therefor.

Column 21

Claim 1, Line 45; delete "Calculating" and insert -- calculating -- therefor.

UNITED STATES PATENT AND TRADEMARK OFFICE
CERTIFICATE OF CORRECTION

PATENT NO. : 7,254,775 B2
APPLICATION NO. : 09/970474
DATED : August 7, 2007
INVENTOR(S) : Bernard O. Geaghan It is certified that error appears in the above-identified patent and that said Letters Patent is hereby corrected as shown below:

Column 22

Claim 1, Line 4; delete "Wherein" and insert -- wherein. -- therefor.
Claim 4, Line 19; delete "due n" and insert -- due to -- therefor.
Claim 11, Line 38; delete "seven" and insert -- screen -- therefor.

Signed and Sealed this

Thirteenth Day of May, 2008

JON W. DUDAS
*Director of the United States Patent and Trademark Office*